United States Patent
Ye et al.

(10) Patent No.: US 10,110,910 B2
(45) Date of Patent: Oct. 23, 2018

(54) PARALLEL DECODING METHOD FOR LAYERED VIDEO CODING

(71) Applicant: Vid Scale, Inc., Wilmington, DE (US)

(72) Inventors: Yan Ye, San Diego, CA (US); Yong He, San Diego, CA (US); Yuwen He, San Diego, CA (US); Srinivas Gudumasu, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 60 days.

(21) Appl. No.: 14/519,819

(22) Filed: Oct. 21, 2014

(65) Prior Publication Data
US 2015/0110172 A1  Apr. 23, 2015

Related U.S. Application Data

(60) Provisional application No. 61/893,878, filed on Oct. 21, 2013.

(51) Int. Cl.
*H04N 19/33* (2014.01)
*H04N 19/436* (2014.01)
*H04N 19/59* (2014.01)

(52) U.S. Cl.
CPC ........... *H04N 19/33* (2014.11); *H04N 19/436* (2014.11); *H04N 19/59* (2014.11)

(58) Field of Classification Search
CPC .................................................... H04N 19/33
USPC ..................................................... 375/240.02
See application file for complete search history.

(56) References Cited

U.S. PATENT DOCUMENTS

| | | | | | |
|---|---|---|---|---|---|
| 6,145,069 | A * | 11/2000 | Dye | ......................... | H03M 7/30 345/501 |
| 8,175,152 | B2 * | 5/2012 | Tokumitsu | ............. | H04N 19/61 375/240.1 |
| 8,559,524 | B2 * | 10/2013 | Lee | ......................... | H04N 19/61 375/240.25 |
| 8,699,561 | B2 * | 4/2014 | Liu | ......................... | H04N 19/61 375/240 |

(Continued)

OTHER PUBLICATIONS

Bross et al., "High Efficiency Video Coding (HEVC) Text Specification Draft 7", JCTVC-I1003, 9th Meeting: Geneva, CH, Apr. 27-May 7, 2012, 273 pages.

(Continued)

*Primary Examiner* — Dave Czekaj
*Assistant Examiner* — Shanika Brumfield
(74) *Attorney, Agent, or Firm* — Condo Roccia Koptiw LLP

(57) ABSTRACT

Systems, methods, and instrumentalities are disclosed for parallel decoding of a layered video stream. A base layer video stream and an enhancement layer video stream may be received. A picture of the base layer video stream may be decoded via a first processing thread. An inter-layer reference picture associated with the base layer video stream may be generated via the first processing thread. The inter-layer reference picture may include one or more motion fields. A picture of the enhancement layer video stream may be decoded via a second thread using the inter-layer reference picture. The first processing thread and the second processing thread may be synchronized such that the decoding of the picture of the enhancement layer video stream is performed after the generation of the inter-layer reference picture.

29 Claims, 17 Drawing Sheets

(56) References Cited

U.S. PATENT DOCUMENTS

| | | | | |
|---|---|---|---|---|
| 2002/0091905 | A1* | 7/2002 | Geiger | H03M 7/30 711/170 |
| 2003/0138045 | A1* | 7/2003 | Murdock | H04N 19/44 375/240.12 |
| 2009/0245349 | A1* | 10/2009 | Zhao | H04N 19/436 375/240.03 |
| 2011/0122944 | A1* | 5/2011 | Gupta | H04N 19/33 375/240.12 |
| 2012/0207227 | A1* | 8/2012 | Tsai | H04N 19/136 375/240.29 |
| 2015/0023409 | A1* | 1/2015 | Schierl | H04N 19/70 375/240.02 |

OTHER PUBLICATIONS

Chen et al., "SHVC Draft 3", JCTVC-N1008, 14th Meeting: Vienna, AT, Jul. 25-Aug. 2, 2013, 71 pages.

Hamidouche et al., "On Software Complexity: Real Time and Parallel SHVC Video Decoder", JCTVC-N0043, 14th Meeting: Vienna, AT, Jul. 25-Aug. 2, 2013, 4 pages.

Husak et al., "Ad Hoc on Mpeg Frame Compatible (MFC) Stereo Coding", MPEG, Document No. m21465, Feb. 2012.

Intel Corporation, "Intel® Architecture Instruction Set Extensions Programming Reference", Ref. # 319433-015, Jul. 2013, 934 pages.

ISO/IEC, "Information Technology-Coding of Audio-Visual Objects-Part 2: Visual", Reference No. ISO/IEC 14496-2:2001(E), Dec. 1, 2001, 536 pages.

ISO/IEC, Information Technology-Coding of Moving Pictures and Associated Audio for Digital Storage Media at up to about 1,5 Mbit/s-Part 2: Video, Ref. No. ISO/IEC 11172-2:1993/Cor. 3:2003(E), Nov. 1, 2003, 6 pages.

ISO/IEC, "Joint Call for Proposals on Scalable Video Coding Extensions of High Efficiency Video Coding (HEVC)", ISO/IEC JTC1/SC29/WG11 N12957, Stockholm, Sweden, 11 pages.

ITU, "Series H: Audiovisual and Multimedia Systems-Coding of Moving Video", CCITT, Recommendation H.261, Nov. 1988, 14 pages.

ITU-R, "Parameter Values for the HDTV Standards for Production and International Programme Exchange", Recommendation ITU-R Bt.709, Dec. 2010, 19 pages.

ITU-R, "Parameter Values for UHDTV Systems for Production and International Programme Exchange", ITU-R Recommendation BT.2020, Apr. 2012, 8 pages.

ITU-T, "Advanced Video Coding for Generic Audiovisual Services", ITU-T Recommendation H.264, Nov. 2007, 564 pages.

ITU-T, "Information Technology—Generic Coding of Moving Pictures and Associated Audio Information: Video", ITU-T Recommandation H.262, Feb. 2000, 12 pages.

ITU-T, "Video Coding for Low Bit Rate Communication", ITU-T Recommendation H.263, Transmission of Non-Telephone Signals, Mar. 1996, 52 pages.

Luthra et al., "Requirements of the scalable enhancement of HEVC", ISO/IEC JTC1/SC29/WG11 N12956, Stockholm, Sweden, Jul. 2012, 12 pages.

Luthra et al., "Use Cases of the Scalable Enhancement of HEVC", ISO/IEC JTC1/SC29/WG11 N12955, Stockholm, Sweden, Jul. 2012, 8 pages.

Ohm, Jens-Rainer, "Advances in Scalable Video Coding", Proceedings of the IEEE, vol. 93, No. 1, Jan. 2005, 15 pages.

Schwarz et al., "Overview of the Scalable Video Coding Extension of the H.264/AVC Standard", IEEE Transactions on Circuits and Systems for Video Technology, vol. 17, No. 9, Sep. 2007, 18 pages.

Segall et al., "Description of Core Experiment SCE4: Color Gamut and Bit-Depth Scalability", JCTVC-N1104, 14th Meeting: Vienna, AT, Jul. 25-Aug. 2, 2013, 5 pages.

Vetro et al., "Overview of the Stereo and Multiview Video Coding Extensions of the H.264/MPEG-4 AVC Standard", Proceedings of the IEEE, Mitsubishi Electric Research Laboratories, Jan. 2011, 17 pages.

* cited by examiner

PARALLEL DECODING METHOD FOR LAYERED VIDEO CODING

CROSS REFERENCE TO RELATED APPLICATIONS

This application claims the benefit of U.S. Provisional Patent Application No. 61/893,878, filed Oct. 21, 2013; the contents of which are incorporated by reference herein.

BACKGROUND

Digital video compression technologies have been developed and standardized to enable digital video communication, distribution and consumption. Most of the commercially widely deployed standards are developed by ISO/IEC and ITU-T, such as H.261, MPEG-1, MPEG-2, H.263, MPEG-4 part2 and H.264/MPEG-4 part 10 AVC, for example. Due to the emergence and maturity of new advanced video compression technologies, a new video coding standard, High Efficiency Video Coding (HEVC), has been jointly developed by ITU-T Video Coding Experts Group (VCEG) and ISO/IEC Moving Picture Experts Group (MPEG) and was recently standardized. The goal of HEVC is to achieve twice as much compression as H.264/AVC, or equivalently, halve the bit rate required at the same video quality.

SUMMARY

Systems, methods, and instrumentalities are disclosed for parallel decoding associated with a layered video stream. A base layer video stream may be received. An enhancement layer video stream may be received. The base layer video stream and the enhancement layer video stream may be received by a decoder. The base layer video stream may be decoded via a first processing thread. The first processing thread may decode a picture of the base layer video stream. The decoding of the picture of the base layer video stream may include entropy decoding a slice of the picture via one or more threads processed in parallel. The decoding of the picture of the base layer video stream may include decompressing the slice via a plurality of threads processed in parallel based on groups of largest coding units (LCUs) of the slice. A thread of the plurality of threads may be selected to decompress a second group of LCUs upon completion of decompressing a first group of LCUs. Decoding a picture of the base layer video stream may include entropy decoding and decompressing a slice of the picture of the base layer video stream via a plurality of threads processed in parallel. Decompressing the slice may be performed based on groups of largest coding units (LCUs) of the slice.

An inter-layer reference picture may be generated via the first processing thread. The inter-layer reference picture may be associated with the picture of the base layer video stream. The inter-layer reference picture may comprise one or more motion fields. The decoder may indicate that the inter-layer reference picture has been generated. A picture of the enhancement layer video stream may be decoded via a second processing thread using the inter-layer reference picture. The picture of the enhancement layer video stream may be collocated with the picture of the base layer video stream. For example, the picture of the enhancement layer video stream may be temporally collocated with the picture of the base layer video stream (e.g., the picture of the base layer picture and the picture of the enhancement layer picture may be at the same time instance).

The decoder may synchronize the first processing thread and the second processing thread. For example, the first processing thread and the second processing thread may be synchronized such that the decoding of the picture of the enhancement layer video stream is performed after the generation of the inter-layer reference picture.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Digital video services may refer to TV services over satellite, cable and/or terrestrial broadcasting channels. Video applications, such as video chat, mobile video recording and sharing, and video streaming, may use video transmission in a heterogeneous environment. 3-screen and N-screen scenarios may refer to various consumer devices (e.g., PCs, smart phones, tablets, TVs) and may accommodate video consumption on devices with widely varying capabilities in terms of computing power, memory/storage size, display resolution, display frame rate, display color gamut, etc. The network and/or transmission channels may include varying characteristics in terms of packet loss rate, available channel bandwidth, burst error rate, etc. Video data may be transmitted over a wired network and/or a wireless network, which may further complicate the underlying transmission channel characteristics.

Scalable video coding may provide an attractive solution to improve the quality of experience for video applications running on devices with different capabilities over heterogeneous networks. Scalable video coding may encode a signal (e.g., video stream) once at a highest representation (e.g., temporal resolution, spatial resolution, quality, etc.), and enable decoding from subsets of the signal, for example, depending on the specific rate and representation used by certain applications running on the client device. Scalable video coding may save backbone network bandwidth and/or storage as compared to non-scalable solutions. Video standards (e.g., MPEG-2 Video, H.263, MPEG4 Visual, H.264, and/or the like) may have tools and/or profiles that support scalability.

Figure 1:
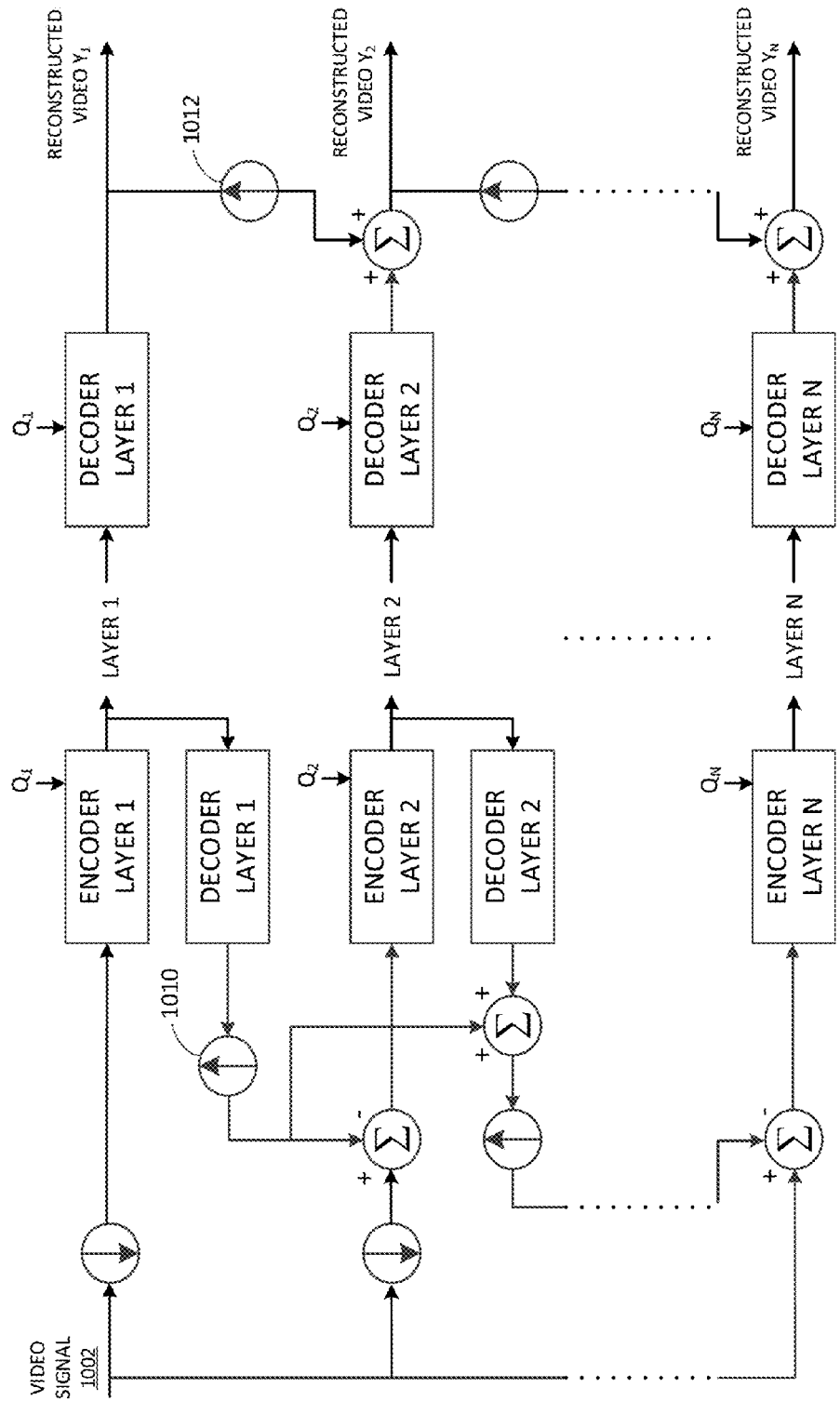
FIG. 1 is a block diagram of an example of a block-based hybrid scalable video encoding system.

FIG. 1 is a diagram illustrating an example of a block-based hybrid scalable video encoding system. The spatial/temporal signal resolution that may be represented by the layer 1 (e.g., the base layer) may be generated by down-sampling of the input video signal 1002. A setting of the quantizer (e.g., Q1) may lead to a certain quality level of the base information. The base-layer reconstruction Y1, which may be an approximation of one or more (e.g., all) of the higher layer resolution levels, may be used in the encoding and/or decoding of the subsequent layers. For example, the base-layer reconstruction Y1 may enable more efficient encoding of the subsequent higher layers. The up-sampling unit 1010 and/or 1012 may perform up-sampling of the base layer reconstruction signal to layer-2's resolution. Down-sampling and up-sampling may be performed throughout the layers (e.g., 1, 2 . . . N). Down-sampling and up-sampling ratios may be different depending on the dimension of the scalability between two given layers.

As illustrated in FIG. 1, for a higher layer n ($2 \leq n \leq N$), a differential signal may be generated by subtracting an upsampled lower layer signal (e.g., layer n−1 signal) from the current layer n signal. The difference signal obtained may be encoded. If the video signals represented by the layers (e.g., n1 and n2) have the same spatial resolution, the corresponding down-sampling and up-sampling operations may be by-passed. A given layer n ($1 \leq n \leq N$) or a plurality of layers may be decoded without using any decoded information from higher layers.

Relying on coding of the residual signal (e.g., the difference signal between two layers) for the layers except the base layer, for example, as may be used by the system of FIG. 1, may cause visual artifacts. The visual artifacts may be due to quantization and normalization of the residual signal to restrict its dynamic range, and/or additional quantization performed during coding of the residual.

One or more of the higher layer encoders may adopt motion estimation and/or motion compensated prediction as an encoding mode. Motion estimation and/or motion compensation in a residual signal may be different from conventional motion estimation and, for example, may be more prone to visual artifacts. More sophisticated residual quantization, as well as joint quantization between the desire to quantize and normalize the residual signal to restrict its dynamic range and additional quantization performed during coding of the residual may be utilized and may increase system complexity, for example, to minimize such visual artifacts.

Scalable Video Coding (SVC) is an extension of H.264 that may enable the transmission and/or decoding of partial bit streams. SVC may provide video services with lower temporal resolution, lower spatial resolution, and/or reduced fidelity while retaining a reconstruction quality (e.g., higher reconstruction quality) given the rate of the partial bit streams. SVC may include Single Loop Decoding. For example, an SVC decoder may set up one motion compensation loop at the layer being decoded and may not set up motion compensation loop(s) at other layer(s). For example, the bitstream may include two layers, layer 1 (e.g., a base layer) and layer 2 (e.g., an enhancement layer). A decoder may reconstruct layer 2 video by setting a decoded picture buffer and/or a motion compensated prediction (e.g., for layer 2 and not for layer 1; layer 2 may depend on layer 1).

SVC may not require a reference picture(s) from lower layers to be fully reconstructed, which may reduce computational complexity and memory utilized at the decoder. Single loop decoding may include constrained inter-layer texture prediction. For a block (e.g., a current block) in a given layer, spatial texture prediction from a lower layer may be utilized if the corresponding low layer block is coded in intra mode (e.g., restricted intra prediction). When the lower layer block is coded in intra mode, the lower layer block may be reconstructed without motion compensation operations and/or a decoded picture buffer. SVC may include additional inter-layer prediction techniques, for example, motion vector prediction, residual prediction, mode prediction, and/or the like. Motion vector prediction may include motion field prediction. Single loop decoding of SVC may reduce the computational complexity and/or memory used at the decoder. The single loop decoding may increase implementation complexity, for example, by relying on block-level inter layer prediction implementations to achieve satisfactory performance. Encoder design and computation complexity may be increased such that the desired performance may be achieved, for example, to compensate for the performance penalty incurred by imposing the single loop decoding constraint. Scalable coding of interlaced content may not be supported by SVC with sufficient performance, which may affect its adoption by the broadcasting industry.

Multi-view Video Coding (MVC) is an example extension of H.264 that may provide view scalability. In view scalability, a base layer bitstream may be decoded to reconstruct a conventional 2D video. In view scalability, one or more enhancement layers may be decoded to reconstruct other view representations of the same video signal. When one or more views (e.g., all views) are combined together and displayed by a proper 3D display, the user may experience 3D video with proper depth perception.

Figure 2:
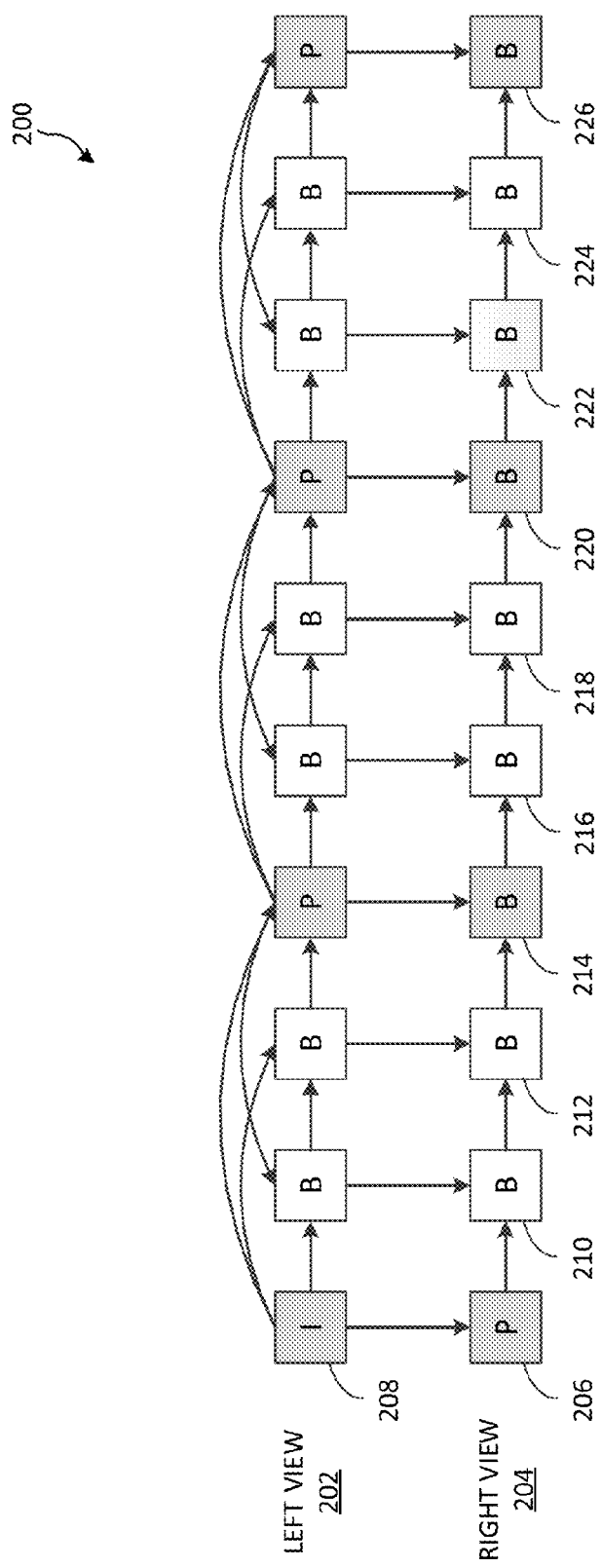
FIG. 2 is a diagram illustrating an example prediction structure using MVC to code a stereoscopic video with a left view and a right view.

FIG. 2 is a diagram illustrating an example prediction structure 200 using MVC to code a stereoscopic video with a left view 202 (e.g., a base layer) and a right view 204 (e.g., an enhancement layer). As illustrated by example in FIG. 2, the left view video 202 may be coded with an IBBP prediction structure. The right view video 204 may be coded with a PBBB prediction structure. For example, in the right view 204, the first collocated picture 206 with the first I picture 208 in the left view 202 may be coded as a P picture. Other (e.g., subsequent) pictures in the right view 204 may be coded as B pictures 210, 212, 214, 216, 218, 220, 222, 224, 226. B pictures 210, 212, 214, 216, 218, 220, 222, 224, 226 may include a first prediction associated with (e.g., coming from) temporal references in the right view 204 and a second prediction associated with (e.g., coming from) an inter-layer reference in the left view 202. MVC may not support single loop decoding. For example as shown in FIG. 2, decoding of the right view 204 (e.g., an enhancement layer) video may require the entire pictures in the left view 202 (e.g., a base layer) to be available. MVC may support motion compensation loops in both the left view 202 and the right view 204.

MVC may include (e.g., only include) high level syntax changes. MVC may not include block-level changes to H.264/AVC. For example, since the underlying MVC encoder/decoder logics may remain the same and may be duplicated, reference pictures (e.g., only reference pictures) at a slice or a picture level may be configured to enable MVC. MVC may perform inter-layer prediction across multiple views (e.g., to support coding of more than two views).

Moving Picture Experts Group (MPEG) frame compatible (MFC) coding may be utilized as a coding technique. 3D content may be stereoscopic 3D video, which may include one or more views, e.g., a left view and a right view. Stereoscopic 3D content delivery may be achieved by packing and/or multiplexing the two views into one frame, and compressing and/or transmitting the packed video with a codec (e.g., H.264/AVC). At the receiver side, after decoding, the frames may be unpacked and displayed as two views. The views may be multiplexed in the temporal domain and/or the spatial domain. When the views are multiplexed in the spatial domain, the two views may be spatially downsampled by a factor (e.g., a factor of two) and may be packed by various arrangements, for example in order to maintain the same picture size. For example, a picture may be arranged with the downsampled left view on the left half of the picture, and the downsampled right view on the right half of the picture. Other arrangements may include top-and-bottom, line-by-line, checkerboard, etc. The specific arrangement used to achieve frame compatible 3D video may be conveyed by frame packing arrangement SEI messages. Spatial downsampling may cause aliasing in the views. Spatial downsampling may reduce the visual quality and/or user experience of 3D video. A scalable extension to frame compatible (e.g., two views packed into the same frame) base layer video may be provided. One or more enhancement layers may be provided to recover the full resolution views for improved 3D experience. Full-resolution MFC may be related to spatial scalability technologies.

Scalable enhancement of HEVC may be provided. The scalable enhancement of HEVC may provide spatial scalability and/or standards scalability. Standards scalability may refer to a type of scalability where the base layer is encoded with one standard (e.g., H.264/AVC, MPEG2, or the like) while the one or more enhancement layers are encoded using another standard (e.g., HEVC). Standards scalability may provide backward compatibility for legacy content already encoded using previous standards. Standards scalability may enhance the quality of the legacy content with one or more enhancement layers encoded with different standards (e.g., HEVC), which may provide better coding efficiency.

Table 1 provides an example of different types of scalabilities and the corresponding standards that support them. Bit-depth scalability, color gamut scalability, and/or chroma format scalability may be tied to the base layer (BL) and/or enhancement layer (EL) video formats. For example, for bit depth scalability the BL video may be in 8 bits, whereas the EL video may be higher than 8-bit. For example, for color gamut scalability the BL video may be color graded in BT.709 color gamut, whereas the EL video may be color graded in BT.2020 color gamut. For example, for chroma format scalability the BL video may be the YUV4:2:0 format widely used by consumer video applications, whereas the EL video may be in YUV4:2:2 or YUV4:4:4 format.

TABLE 1

Examples of different types of scalabilities

| Scalability | Example | Standards |
| --- | --- | --- |
| View scalability | 2D→3D (2 or more views) | MVC, MFC, 3DV |
| Spatial scalability | 720 p→1080 p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-/12-bit video | Scalable HEVC |
| Chroma format scalability | YUV4:2:0→YUV4:2:2, YUV4:4:4 | Scalable HEVC |
| Color gamut scalability | BT.709 (HDTV) –> BT.2020 (UHDTV) | Scalable HEVC |
| Aspect ratio scalability | 4:3→16:9 | Scalable HEVC |

Video format(s) for Ultra High Definition TV (UHDTV) applications may be provided. As shown in Table 2, UHDTV may support larger spatial resolution (e.g., up to 4K×2K (3840×2160) and 8K×4K (7680×4320) resolutions), higher frame-rate (e.g., up to 120 Hz), higher sample bit depth (e.g., 10 bits or 12 bits), and/or wider color gamut as compared to the High Definition TV (HDTV) video format. Table 2 provides an example comparison of the HDTV and UHDTV technical specifications.

TABLE 2

Example Comparison of HDTV (BT.709) and UHDTV (BT.2020) technical specifications

| | | High Definition | Ultra High Definition |
| --- | --- | --- | --- |
| ITU-R BT series | | BT.709-5 (part 2) | BT.2020 |
| Spatial resolution | | 1920 × 1080 | 7680 × 4320, 3840 × 2160 |
| Temporal | Frame rate | 60, 50, 30, 25, 24 | 120, 60, 50, 30, 25, 24 |
| | Scan | Progressive, interlaced | Progressive |
| Primary colors | Red primary | (0.640, 0.300) | (0.708, 0.292) |
| | Green primary | (0.150, 0.330) | (0.170, 0.797) |
| | Blue primary | (0.600, 0.060) | (0.131, 0.046) |
| | White point | (0.3127, 0.3290) (D65) | |
| Coding format | | 8- and 10-bit | 10- and 12-bit |

Figure 3:
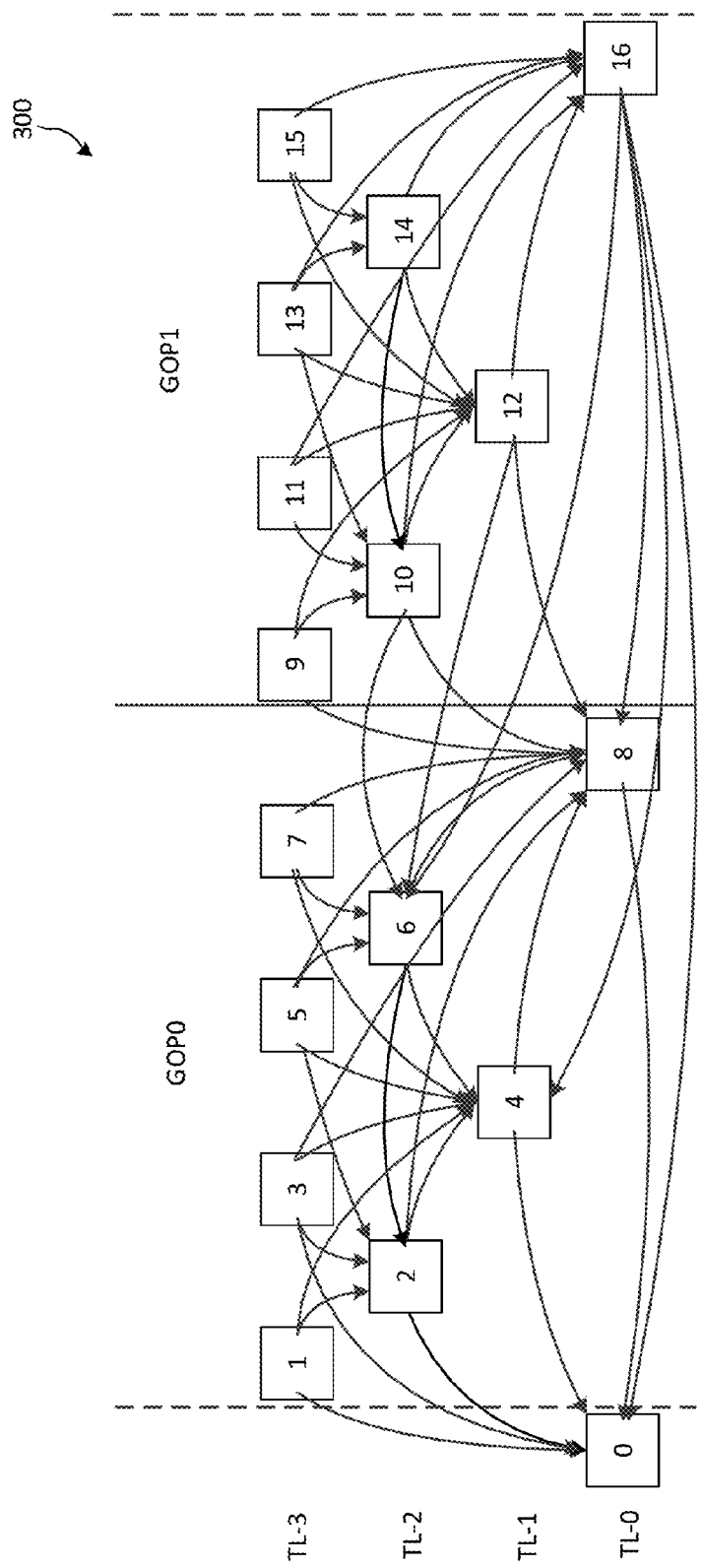
FIG. 3 is a diagram of example decoding dependencies of pictures in a hierarchical coding structure.

HEVC may include one or more high-level parallel processing tools (e.g., wavefront, tile, and/or slice). High level processing may provide for fast decoding at the cost of small coding efficiency loss. A wavefront processing tool may enable entropy decoding for each LCU row to be processed in parallel within one slice. A tile processing tool may enable the decoder to decode each tile in parallel within one slice. A slice processing tool may enable the decoder to process each sub-picture (e.g., slice) in parallel within one picture. FIG. 3 is a diagram of example decoding dependencies of pictures in a hierarchical coding structure 300. For example, picture 2 may start decoding after picture 0, pictures 4 and 8 may be decoded because picture 2 references picture 0, 4 and 8. Pictures (e.g., all pictures) at a top layer (TL-3) (e.g., odd pictures in FIG. 3) may be independent and may be decoded in parallel. There may be a longer delay to process future pictures in parallel with a current picture and/or additional memory may be used to store more decoded pictures in a decoded picture buffer(s).

Figure 4:
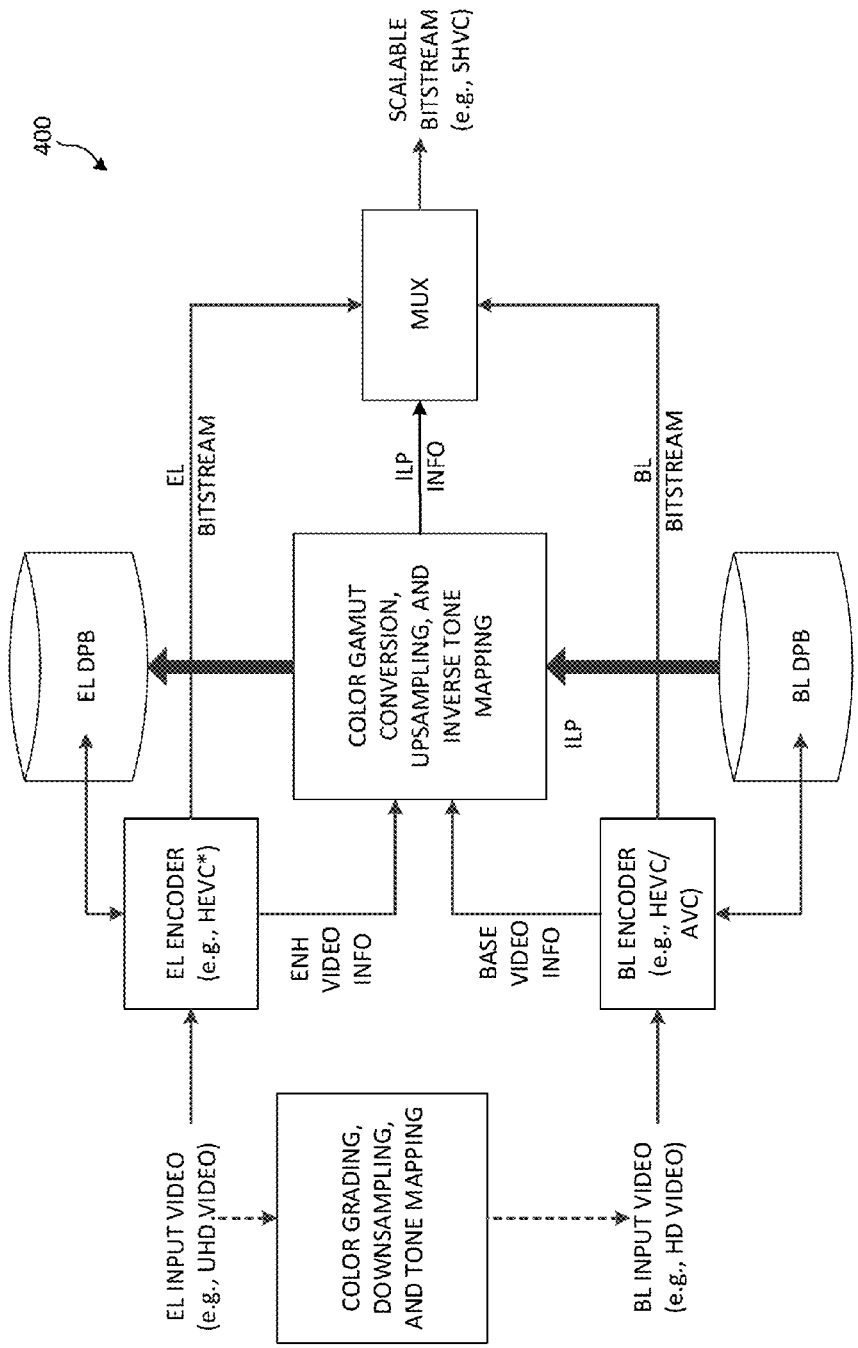
FIG. 4 is a diagram of an example architecture of a two-layer scalable video encoder.
Figure 5:
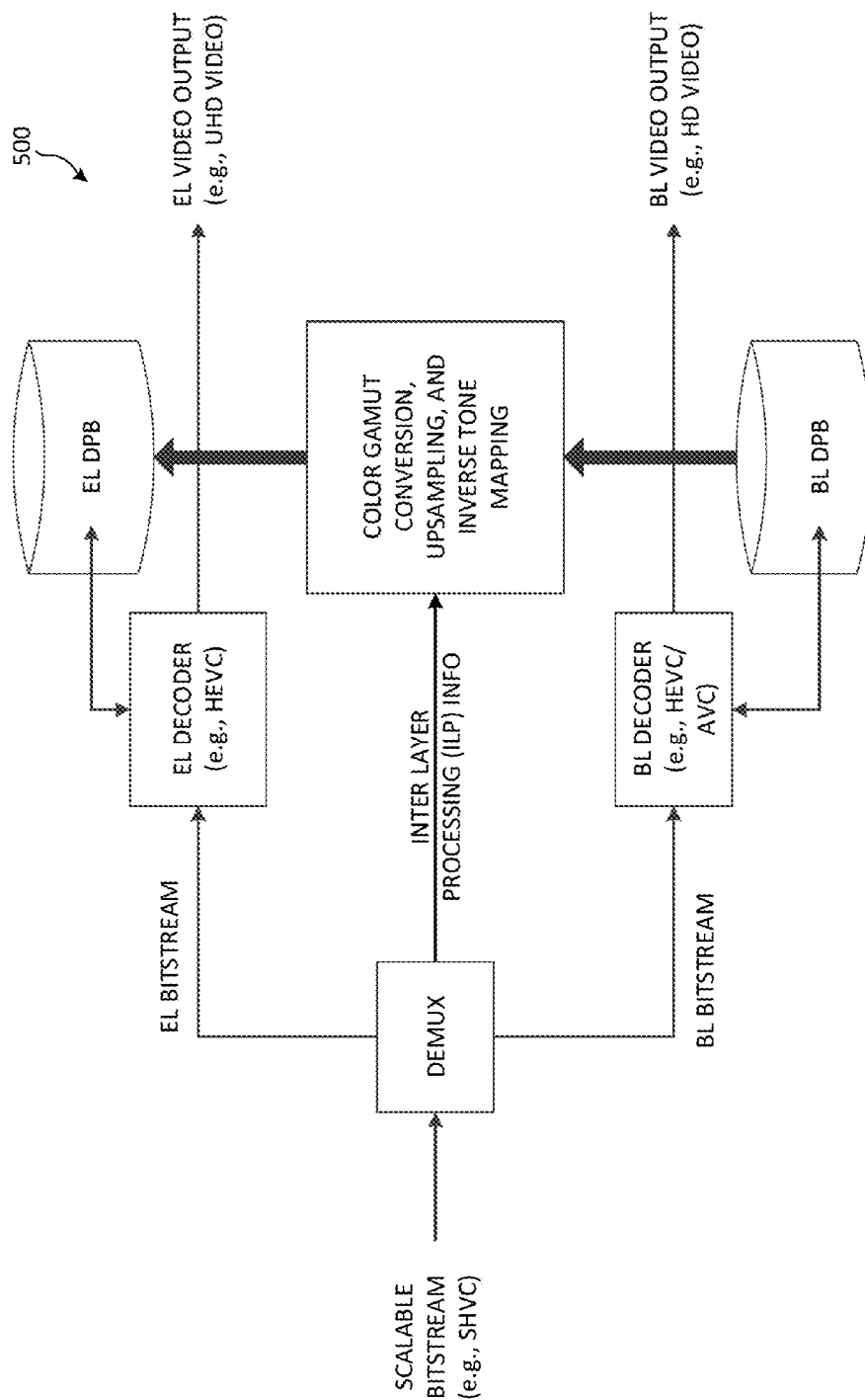
FIG. 5 is a diagram of an example architecture of a two-layer scalable video decoder.

FIG. 4 is a diagram of an example architecture of a two-layer scalable video encoder 400. FIG. 5 is a diagram of an example architecture of a two-layer scalable video decoder 500. For example, the encoder 400 and/or the decoder 500 of FIGS. 4 and 5 may enable SHVC encoding and decoding with two layers. The decoder 500 of FIG. 5 may perform base layer decoding, inter-layer processing and/or enhancement layer decoding. The inter-layer processing may include bit-depth conversion, color gamut conversion, and/or resolution conversion from a base layer to an enhancement layer.

Figure 6:
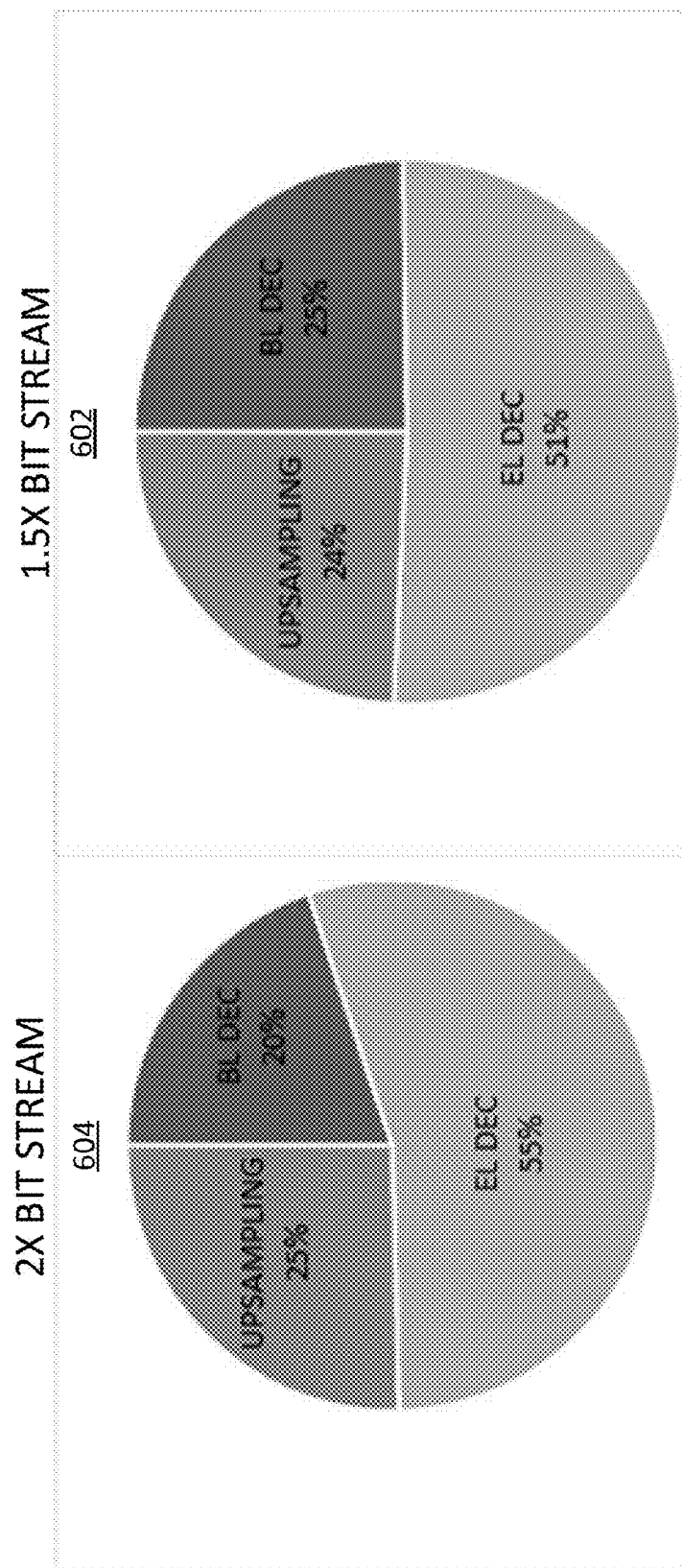
FIG. 6 is a diagram of an example of SHVC decoding profiling results for 1080p 1.5× and 2× bitstreams coded with random access configurations.

FIG. 6 is a diagram of example SHVC decoding profiling results for a 1080p 1.5× bitstream 602 and a 1080p 2× bitstream 604 coded with random access configurations. Base layer decoding may take approximately 20-25% of the total decoding time. Enhancement layer decoding may take approximately 51-55% of the total decoding time. Base layer decoded picture up-sampling and motion vectors (e.g., motion fields) up-sampling may take approximately 24-25% of the total decoding time.

A parallel decoding method may include multi-threading at different levels (e.g., layer and/or slice) and/or SIMD optimizations (e.g., to achieve real-time decoding). The parallel decoding method may be based on SHVC decoding profiling. A plurality of different threads (e.g., processing threads) may be used for parallel processing of a base layer video stream (e.g., bitstream) and an enhancement layer video stream decoding at a decoder (e.g., a top level SHVC decoder). The different threads may include two processors and/or a multiple core processor. A first thread of the decoder may decode the base layer video stream. The first thread of the decoder may generate an inter-layer picture (e.g., an inter-layer reference picture). The inter-layer picture may be generated, at least in part, by up-sampling the reconstructed base layer picture. The inter-layer picture may include one or more motion vectors (e.g., motion fields). The first thread of the decoder may generate the one or more motion vectors. The one or more motion vectors may be generated by up-scaling the base layer compressed motion, for example, according to the spatial ratio information between the two layers. A second thread of the decoder may decode the enhancement layer video stream. The second thread of the decoder may decode the enhancement layer video stream using the inter-layer picture and/or the one or more motion vectors generated by the first thread. Slice level decoding of one or more pictures may be performed in a multi-threaded (MT) pipeline at various stages (e.g., entropy decoding, motion compensation, inverse transform, adaptive loop filtering, and/or the like). The slice level multi-threading design may be applied for single layer video decoding (e.g., HEVC decoding).

A device (e.g., a decoder) may receive a base layer video stream and an enhancement layer video stream. The device may decode a picture of the base layer video stream via a first processing thread. The device may generate, via the first processing thread, an inter-layer reference picture and one or more motion fields. The inter-layer reference picture and the one or more motion fields may be associated with the picture of the base layer video stream. The inter-layer reference picture may include the one or more motion fields. The device may indicate that the inter-layer reference picture and/or the one or more motion fields have been generated. The device may decode a picture of the enhancement layer video stream via a second processing thread. The picture of the enhancement layer video stream may be decoded using the inter-layer reference picture and/or the one or more motion fields. The picture of the enhancement layer video stream may be collocated (e.g., temporally) with the picture of the base layer video stream.

A parallel decoding framework (e.g., a SHVC parallel decoding framework) may be provided. A parallel decoding framework may achieve real time decoding. A parallel decoding framework may include multi-threaded processing, base layer video stream decoding, enhancement layer video stream decoding, and/or up-sampling of a base layer reconstructed picture(s). A parallel decoding framework may include multi-threaded decoding of a slice (e.g., each slice) with a pipeline design. Multi-threaded decoding may include decomposing the decoding process into an entropy decoding stage and/or a reconstruction stage. A parallel decoding framework may include multi-threaded loop filtering by decomposing the loop filtering to a horizontal filtering cascaded with vertical filtering. A parallel decoding framework may include SIMD optimization for motion compensation, inverse transform, and/or de-quantization.

Figure 7:
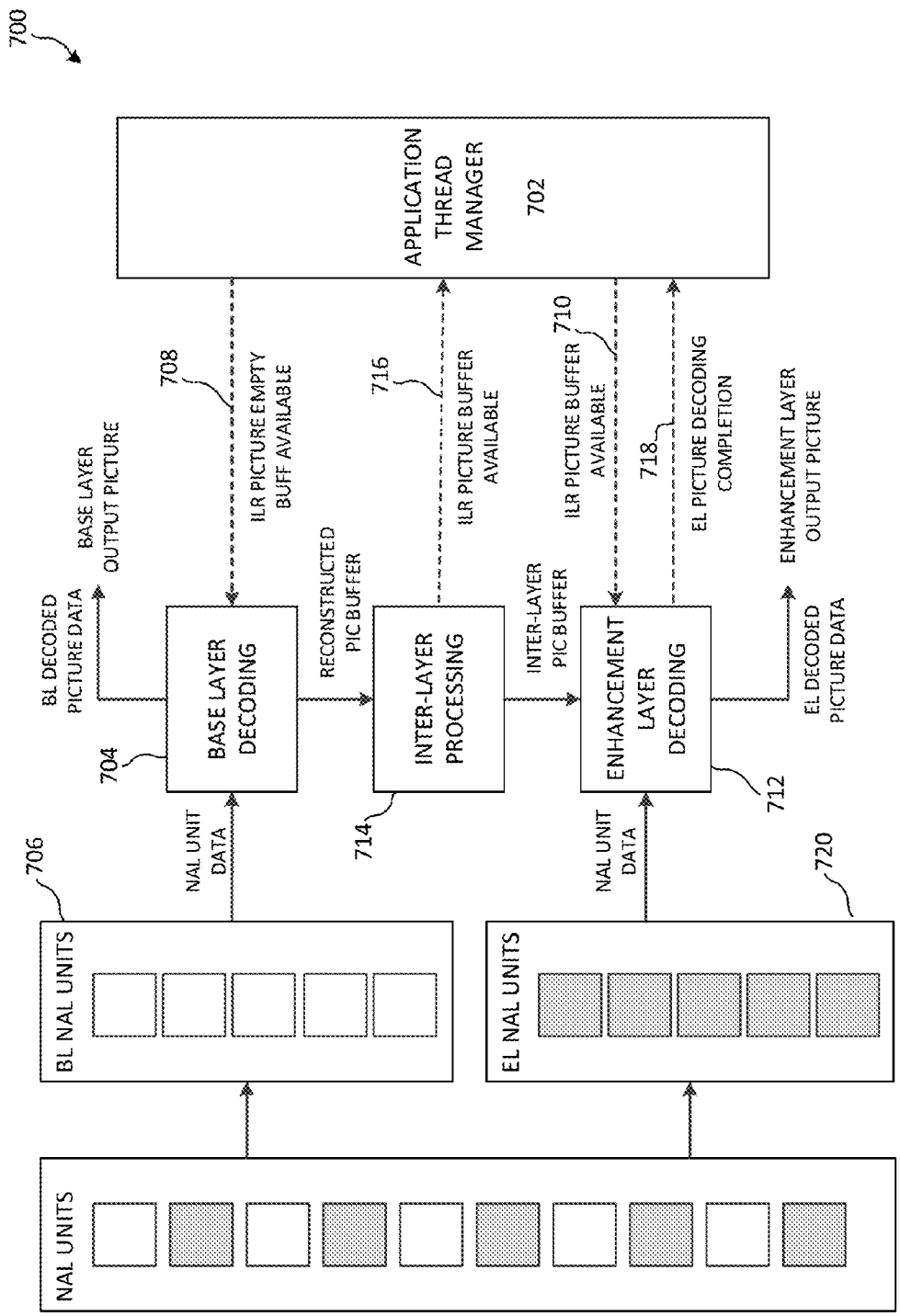
FIG. 7 is a diagram of an example parallel decoding framework.

FIG. 7 is a diagram of an example parallel decoding framework. A parallel decoding framework 700 may include one or more thread managers. For example, a parallel decoding framework 700 may include an application thread manager 702 and/or an internal decoding thread manager (not shown). The application thread manager 702 may control a base layer decoding thread and/or an enhancement layer decoding thread. A base layer decoding module 704 may decode the base layer video stream using, for example, the base layer decoding thread. An inter-layer processing module 714 may perform inter-layer processing for the scalable video stream using, for example, the base layer decoding thread. An enhancement layer decoding module 712 may decode the enhancement layer video stream using, for example, the enhancement layer decoding thread.

The application thread manager 702 may synchronize the base layer decoding thread and the enhancement layer decoding thread. A first thread (e.g., the base layer decoding thread) may decode a picture of the base layer video stream. A second thread (e.g., the enhancement layer decoding thread) may decode a picture of the enhancement layer video stream. The picture of the enhancement layer video stream may correspond to (e.g., be collocated with) the picture of the base layer video stream. The first thread may be synchronized with the second thread, for example, by the application thread manager 702. For example, the first thread and the second thread may be synchronized such that the decoding of a picture of the enhancement layer video stream may be performed after generation of an inter-layer reference picture and/or one or more motion fields. Generation of the inter-layer reference picture may include up-sampling from a collocated base layer reconstructed picture. The decoding of the picture of the enhancement layer video stream may begin after generation of the inter-layer reference picture and/or one or more motion fields. A parallel decoding framework may synchronize the decoding process using application thread manager(s), for example, as described herein.

The base layer decoding module 704 may start decoding of base layer network abstraction layer (NAL) units 706. For example, the base layer decoding module 704 may start decoding based on an availability of an empty picture buffer in an inter-layer reference (ILR) picture buffer list. The application thread manager 702 may send an event (e.g., ILR picture empty buffer available 708) to the base layer thread to notify the availability of the empty picture buffer in the ILR picture list according to the availability of free ILR picture buffer. The inter-layer processing module 714 may include decoding and/or up-sampling a base layer reconstructed picture using, for example, the base layer decoding thread. The inter-layer processing module 714 (e.g., using the base layer decoding thread) may send an ILR picture buffer available event to the application thread manager 702 after decoding and/or up-sampling a base layer reconstructed picture. The application thread manager 702 may send an event (e.g., ILR picture buffer available 710) to the enhancement layer decoding thread about the ILR reference picture buffer availability.

The enhancement layer decoding module 712 may start the decoding process using the enhancement layer decoding thread, for example, after receiving the notification of the availability of the ILR reference picture buffers. For example, the enhancement layer decoding module 712 may start decoding of enhancement layer NAL units 720 upon receiving the event indicating the ILR reference picture buffer availability (e.g., ILR picture buffer available 710). The enhancement layer decoding thread may signal (e.g., EL picture decoding completion 718) the application thread manager 702 when the EL picture decoding is complete. The application thread manager 702 may signal (e.g., ILR picture empty buffer available 708) the base layer decoding thread about the availability of the empty ILR picture buffer to resume the base layer decoding, for example, if the base layer thread is waiting for the empty ILR picture availability.

Figure 8:
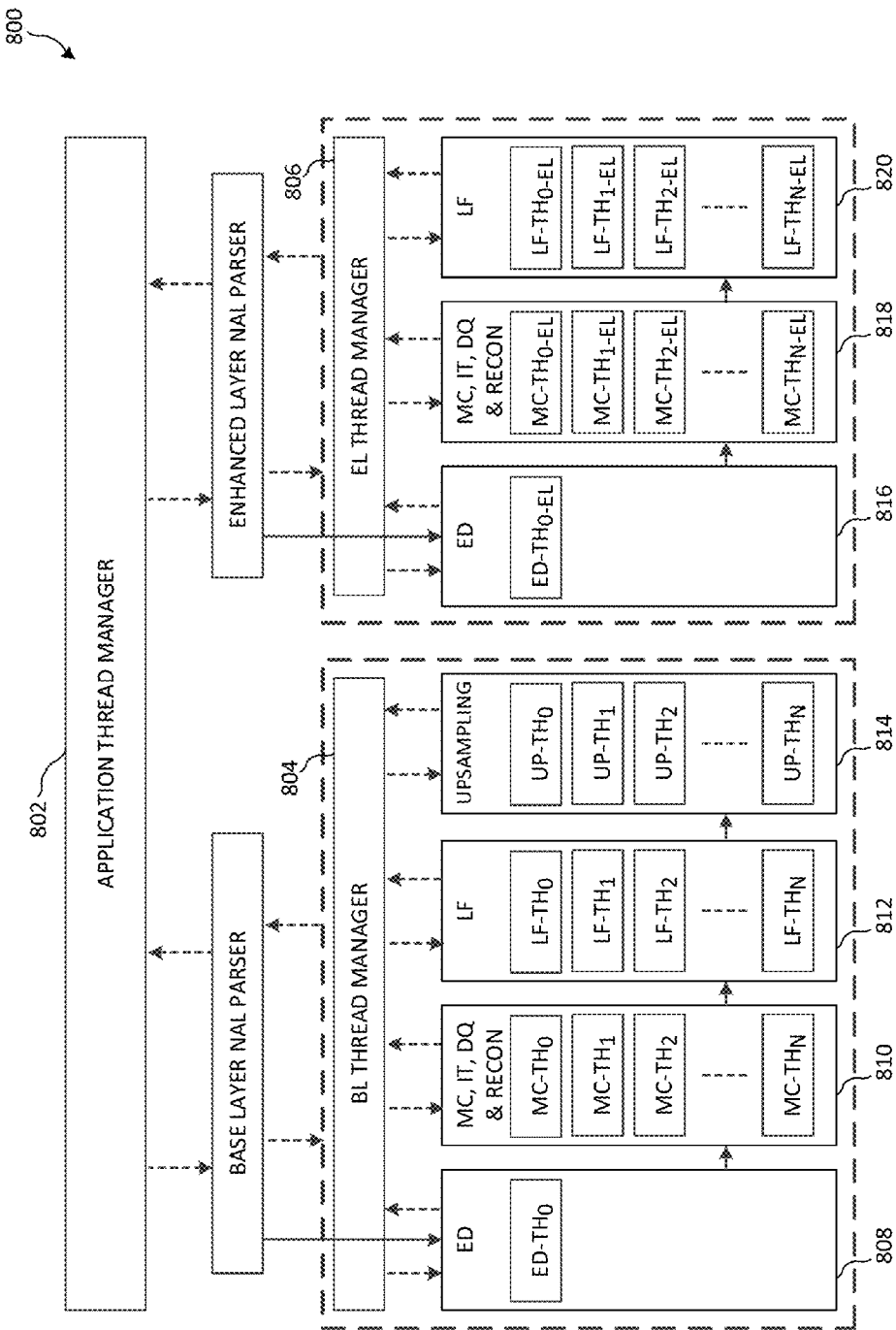
FIG. 8 is a diagram of an example of multi-threaded slice decoding for a base layer and/or an enhancement layer.

FIG. 8 is a diagram of an example of multi-threaded decoding (e.g., slice decoding) for a base layer video stream and/or an enhancement layer video stream. In the system 800, the dashed lines in FIG. 8 may refer to an event arrow flow. The solid lines in FIG. 8 may refer to a data flow. An application thread manager 802 may control and/or synchronize one or more decoding thread(s) (e.g., slice level decoding thread(s)). The application thread manager 802 may be an example of the application thread manager 702. For example, the application thread manager 802 may control and/or synchronize the decoding threads via entropy decoding, motion compensation, inverse transform, loop filtering, and/or up-sampling of a base-layer reconstructed picture(s). The application thread manager 802 may include one or more internal decoding thread managers, for example, a base layer thread manager 804 and/or an enhancement layer thread manager 806.

The application thread manager 802 (e.g., internal decoding thread manager) may handle synchronization of a plurality of threads. The number of threads used for parallel process decoding may be configured during the creation of the video decoder. An example of multi-threaded decoding (e.g., slice decoding) is shown in FIG. 8. The application thread manager 802 may synchronize two or more decoding activities (e.g., slice level decoding activities). The decoding activities may include entropy decoding, decompression, loop filtering, reconstructed picture up-sampling, and/or the like. The application thread manager 802 may control the decoding activities to be progressed in serial. For example, each activity may be performed with parallel processing methodology using multiple threads.

Multi-threaded processing may be performed at a slice level. Multi-threaded processing may be performed at a picture level. One or more modules (e.g., major decoding time consuming modules) may be handled using multi-threaded parallel processing technique, for example, as described herein. The one or more modules may comprise base layer modules and/or enhancement layer modules. For example, the system 800 may comprise a base layer entropy decoding module 808, a base layer motion compensation, inverse transform, and/or reconstruction module 810, a base layer loop filtering module 812, a base layer reconstructed picture up-sampling module 814, and/or the like. The system 800 may further comprise an enhancement layer entropy decoding module 816, an enhancement layer motion compensation, inverse transform, and/or reconstruction module 818, an enhancement layer loop filtering module 820, and/or the like. The base layer thread manager 804 may control the operations of the base layer modules 808-814. The enhancement layer thread manager 806 may control the operations of the enhancement layer modules 816-820.

Parallel processing of entropy decoding and decompression may be provided. The application thread manager 802 may maintain one or more threads (e.g., all threads) used for parallel processing of a particular slice for a layer. The base layer entropy decoding module 808 may use thread ED-TH$_0$ for entropy decoding of a slice at the base layer. Although the use of one thread, ED-TH$_0$, is shown, the base layer decoding module 808 may use a plurality of threads in parallel for entropy decoding of a slice at the base layer (e.g., when a wavefront processing tool is enabled). For example, the thread ED-TH$_0$ may perform entropy coding of one coding tree unit (CTU) row, for example, at a time.

Figure 9:
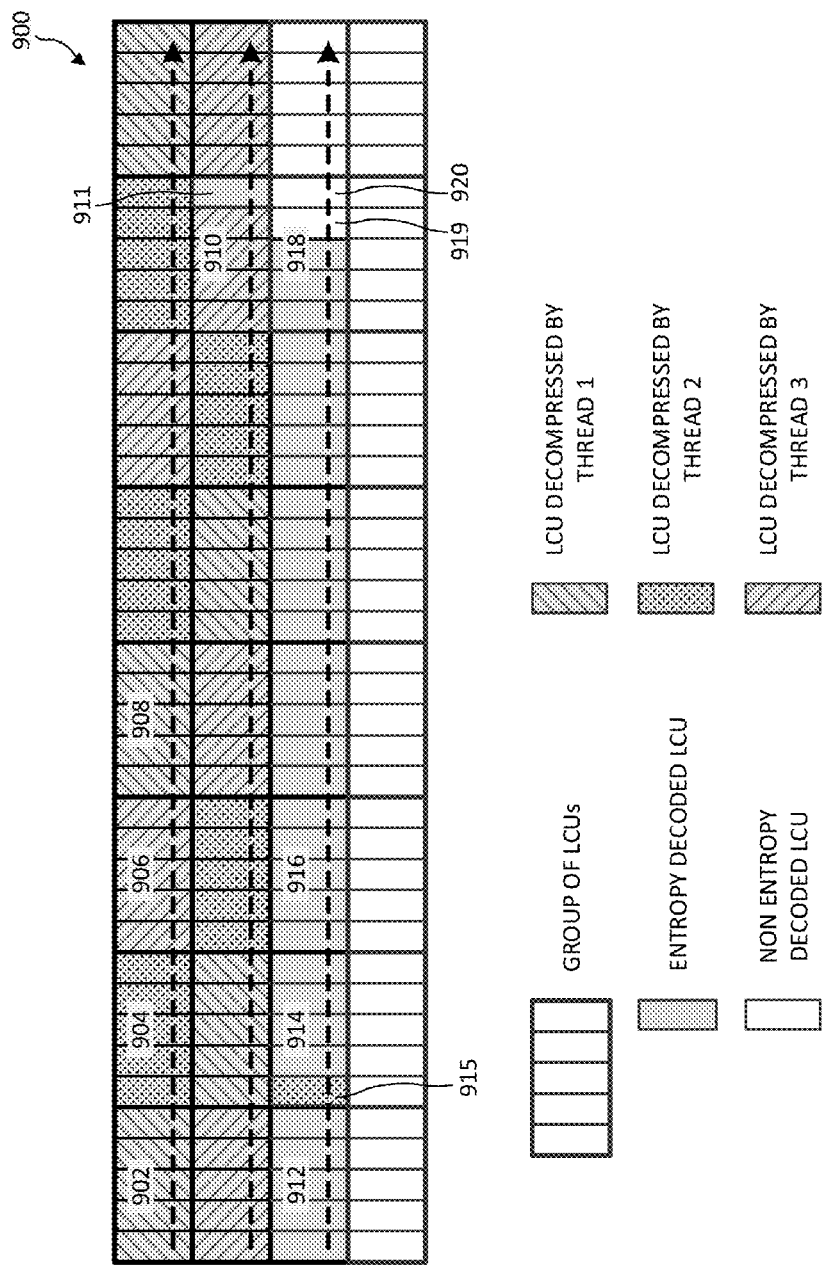
FIG. 9 is a diagram of an example of multi-threaded processing of entropy decoding and decompression within one slice.

The base layer motion compensation, inverse transform, and/or reconstruction module 810 may use one or more threads, such as MC-TH$_0$, MC-TH$_1$, MC-TH$_2$ through MC-TH$_N$, for decompression (e.g., motion compensation, inverse transform, de-quantization and reconstruction, and/or the like) of a slice at the base layer. For example, the one or more threads may decompress a slice of a picture of a base layer video stream. The slice may include one or more largest coding tree units (LCUs). The one or more LCUs in the slice may be separated into groups of LCUs. For example, a group (e.g., each group) of LCUs may include approximately 10 to 20 LCUs configured at the decoder creation time. The slice may be decompressed based on the groups of LCUs, for example, as described with reference to FIG. 9. For example, the slice may be decompressed by the one or more threads processing in parallel based on the groups of LCUs. The size of a LCU group may be associated with the speed of entropy decoding and/or decompression. For example, the base layer motion compensation, inverse transform, and/or reconstruction module 810 may perform decompression of a base layer picture (e.g., and/or slice) using one or more threads MC-TH$_0$, MC-TH$_1$, MC-TH$_2$ through MC-TH$_N$ in parallel with the base layer entropy decoding module 808 performing entropy decoding of the base layer picture (e.g., as shown in FIG. 9). If the size of a LCU group is too large, the parallelism of entropy decoding and/or decompression may be reduced. For example, if the size of a LCU group is too large, decompression threads may have to wait for the entropy decoding of an LCU group to be complete. If the size of a LCU group is too small, a thread context switching of a decompression thread may increase, for example, because a decompression thread may handle (e.g., only handle) one LCU group.

The base layer loop filtering module 812 and/or the base layer reconstructed picture up-sampling module 814 may use one or more threads operating in parallel to perform their respective tasks. The threads LF-TH$_0$, LF-TH$_1$, LF-TH$_2$ through LF-TH$_N$ used by the loop filtering module 812 and/or the threads UP-TH$_0$, UP-TH$_1$, UP-TH$_2$ through UP- TH$_N$ used by the reconstructed picture up-sampling module 814 may be the same or different from the threads MC-TH$_0$, MC-TH$_1$, MC-TH$_2$ through MC-TH$_N$ used by the base layer motion compensation, inverse transform, and/or reconstruction module 810. The enhancement layer modules 816-820 may perform similar functions in a similar manner for the enhancement layer as the base layer modules 808-814 do for the base layer. For example, the enhancement layer decoding module 816 and the enhancement layer motion compensation, inverse transform, and/or reconstruction module 818 may perform parallel processing of an enhancement layer picture (e.g., and/or slice) similar to that described with respect to the base layer entropy decoding module 808 and base layer motion compensation, inverse transform, and/or reconstruction module 810.

A LCU group size may be set (e.g., adaptively set) at the decoding time. The LCU group size may be set based on one or more properties of the video stream (e.g., bitstream) and/or one or more properties of the decoding resources. For example, the LCU group size may be set as follows. N may be the number of LCU's in a slice (e.g., a current slice) to be decoded. T$_{max}$ may be the maximum number of decompression threads available for decoding the current layer, for example, given the local decoding resources (e.g., as limited by hardware platform, the number of processors, and/or software configuration). M may be a minimum LCU Group size. For example, M may be an LCU Group Size which reduces the thread context switching overhead of decompression threads below a threshold c (e.g., c=5%). B may be the average bitrate (e.g., bits per LCU) taken across the LCU's in the current slice. B may provide a measure of entropy decoding speed. DSEntropy(B) may be the entropy decoding speed in LCU/sec at bitrate B. DSDecompression (B) may be the decompression speed in LCU/sec at bitrate B. For example, the LCU group size may be determined according to Equation (1):

$$LCU\_goup\_size = max(M, N/(T_{max} \times max(1, DS_{ED}(B)/DS_{DE}(B)))) \quad (1)$$

The overhead of thread switching may depend on the platform, for example, a number of processor cores, and the dynamic CPU usage status. The entropy decoding speed and decompression speed may depend on the bitrate of decoding bitstream. The setting of a LCU group size may include a trade-off among parallelism and thread switching overhead. The size of a LCU group may be small when the bitrate is high. An entropy decoding thread may decode one or more LCU groups and/or deliver the one or more LCU groups to the decompression threads. When entropy decoding of the LCU group is finished, the decompression threads may begin processing of the LCU group. A decompression thread may process one LCU group at a time (e.g., instead of processing one LCU at a time). Decompressing one LCU group at a time may reduce the synchronization overhead between decompression and entropy decoding. A decompression thread may decompress a first group of LCUs. When the decompression thread is finished decompressing the first group of LCUs, the decompression thread may decompress a second group of LCUs. When a group of LCUs is finished entropy decoding, a decompression thread may be assigned to decompress the group of LCUs. The decompression thread may be selected based on whether it has finished decompressing a prior group of LCUs (e.g., whether the thread is idle). With this approach the entropy decoding and/or decompression activities may be processed in parallel. An entropy decoding and a decompression thread may be used for intra slice decoding, for example, due to the prediction dependency of neighboring intra blocks. Intra coding units within an inter slice may not be decompressed until inter coding units (e.g., all inter coding units) in that slice are decompressed.

FIG. 9 is a diagram of an example of multi-threaded processing framework 900 of entropy decoding and decompression within one slice. FIG. 9 illustrates an example of the dynamic status of LCU group decoding in one slice with one entropy decoding thread and three decompression threads. An entropy decoding thread (e.g., ED-TH$_0$ of FIG. 8) may perform entropy decoding of the slice one LCU at a time. For example, the entropy decoding thread may be performing entropy decoding of a group of LCUs 918. The entropy decoding thread may have performed entropy decoding of three LCUs of the group of LCUs 918 and may not yet have completed entropy decoding of two LCUs 919, 920.

A first decompression thread (e.g., MC-TH$_0$ of FIG. 8) may decompress a first group of LCUs 902. A second decompression thread (e.g., MC-TH$_1$ of FIG. 8) may decompress a second group of LCUs 904. A third decompression thread (e.g., MC-TH$_2$ of FIG. 8) may decompress a third group of LCUs 906. A fourth group of LCUs 908 may be available (e.g., upon being entropy decoded) to be decompressed. In the example of FIG. 9, the first decompression thread may have completed decompression of the first group of LCUs 902 before the second decompression thread or the third decompression thread completed decompression of their respective group of LCUs 904, 906. As such, the first decompression thread performed decompression of the fourth group of LCUs 908.

The third decompression thread may be performing decompression on the group of LCUs 910. The group of LCUs 910 may comprise one LCU 911 that remains to be decompressed. The first decompression thread may be performing decompression on the group of LCUs 912. The group of LCUs 912 may comprise five LCUs that remain to be decompressed. The second decompression thread may be performing decompression on the group of LCUs 914. One LCU 915 of the group of LCUs 914 may be decompressed by the second decompression thread. A decompression thread may not yet be assigned to decompress the group of LCUs 916.

The group of LCUs 916 (e.g., and each subsequent group of LCUs) may be decompressed by the decompression thread that finishes decompression of their assigned group of LCUs first. The next available decompression thread may be assigned to decompress the next (e.g., subsequent) group of LCUs that has been entropy decoded. For example, if the third decompression thread finishes decompressing the group of LCUs 910 before the first decompression thread finishes decompressing the group of LCUs 912 and before the second decompression thread finishes decompressing the group of LCUs 914, the third decompression thread may be assigned (e.g., by an thread manager) to decompress the group of LCUs 916.

The number of decompression threads may depend on a speed of decompression and/or a speed of entropy decoding. The number of decompression threads may be selected to make the speed of decompression comparable with the speed of entropy decoding, for example, so that the pipeline processing may be smooth and less waiting time may be used for synchronization. The number of decompression threads may be dynamically changed, for example, since the entropy decoding speed may depend on the number of bits of each picture. For example, if entropy decoding is slow, fewer decompression threads may be applied and/or the remaining threads may be used for other tasks.

The number of decompression threads for a layer (e.g., each layer) may be determined. For example, the decompression threads may be allocated evenly among all layers. For example, TTmax may be the maximum number of threads the system can support, and the number of decompression threads for each layer may be calculated according to Equation (2):

$$\text{num\_decompression\_threads} = \max(1, TT\text{max}/\text{num\_layer}-1) \qquad (2)$$

The number of decompression threads may be changed (e.g., dynamically changed), for example, because the entropy decoding speed may depend on the number of bits of each picture. If entropy decoding is slow, fewer decompression threads may be applied, and the remaining threads may be used for other tasks. A hierarchical coding structure (e.g., as shown in FIG. 3) may be used, for example, in SHVC and/or HEVC coding. Additional bits may be used for a lower temporal layer(s). Fewer decompression threads may be used for pictures at a lower temporal layer (e.g., such as TL-0 and TL-1), and additional decompression threads may be used for higher temporal layers (e.g., such as TL-2 and TL-3). For example, two decompression threads may be used for TL-0 and TL-1, and three decompression threads may be used for TL-2 and TL-3.

The decompression threads may be reallocated in runtime among different layers. For example, the decompression threads may be allocated evenly for each layer (e.g., initially). During the decoding process, a thread manager (e.g., the enhancement layer thread manager 806) of an enhancement layer may be notified when a base layer thread is waiting for an inter-layer buffer to be released by the enhancement layer. The base layer thread may be waiting for an inter-layer buffer to be released by the enhancement layer because the enhancement layer decoding may lag behind the base layer decoding. An idle decompression thread at a base layer may be collected by the enhancement layer internal decoding thread manager. The idle decompression thread may be reused for the enhancement layer decoding, for example, if the enhancement layer has more LCU groups available for decompression. When the enhancement layer decoding is waiting for the base layer decoding, an idle enhancement layer decompression thread may be used for base layer decoding. The threads may be balanced among the different layers.

Figure 10A:
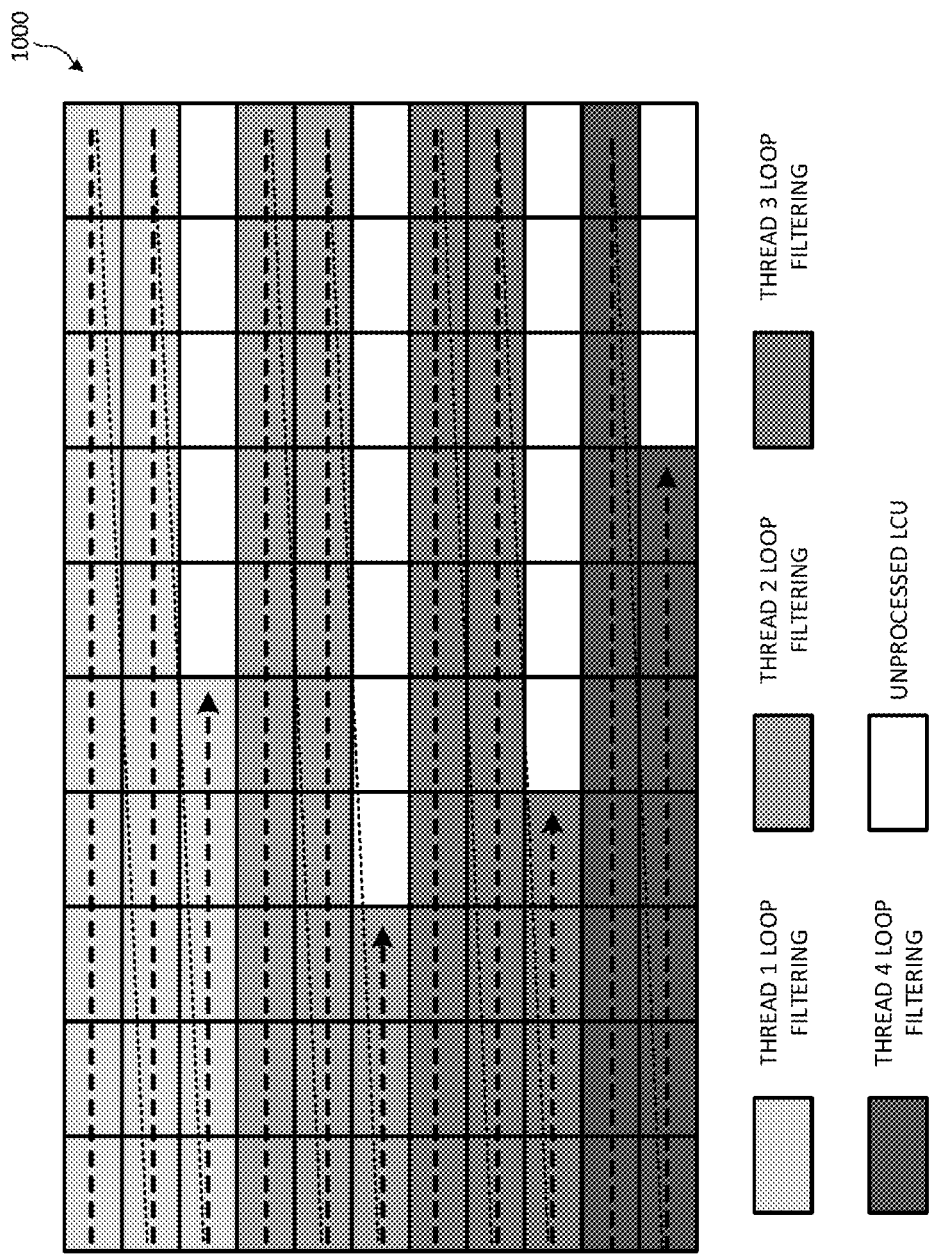
FIG. 10A is a diagram illustrating an example of multi-threaded processing of horizontal loop filtering.
Figure 10B:
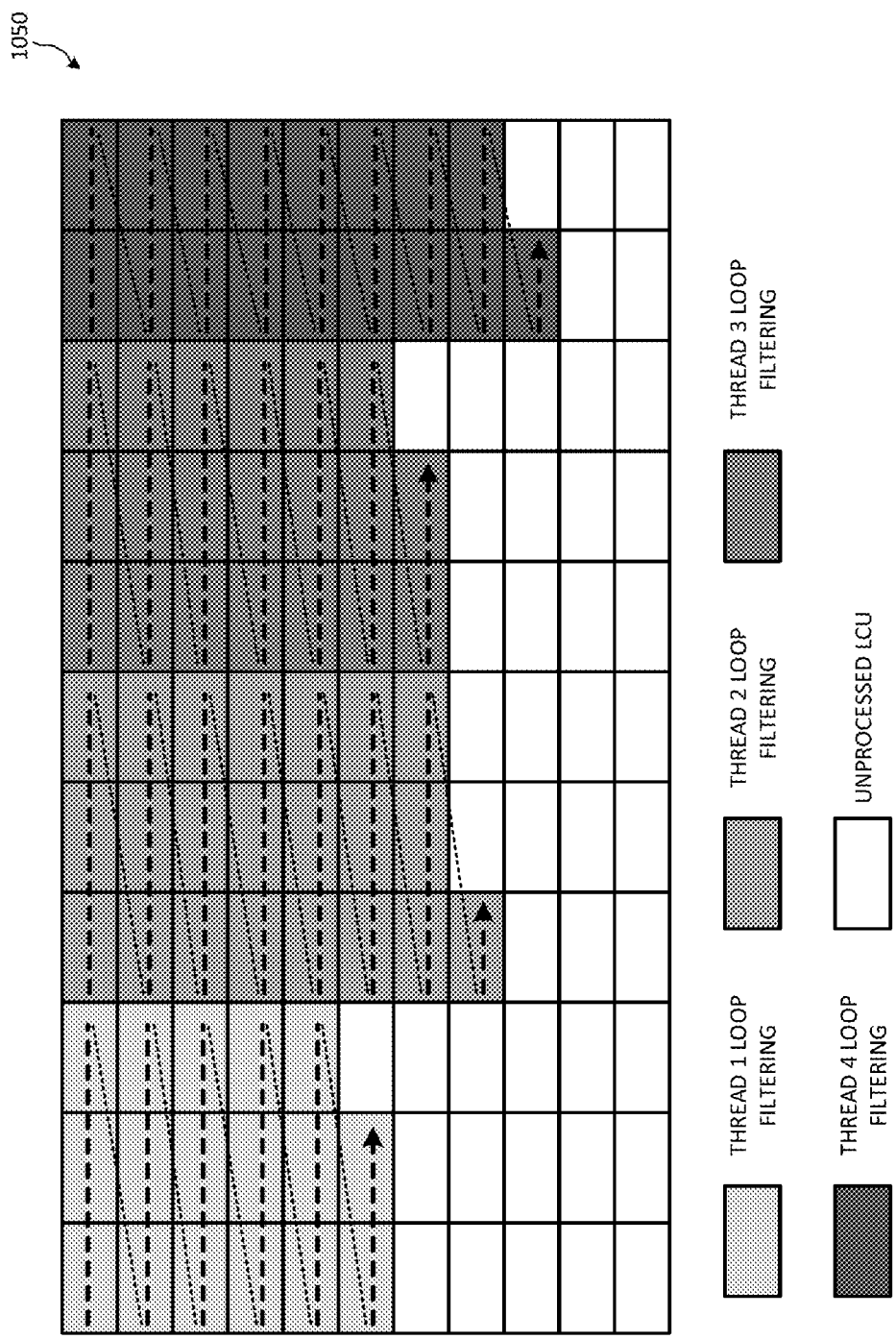
FIG. 10B is a diagram illustrating an example of multi-threaded processing of vertical loop filtering.

Parallel processing of loop filtering may be provided. FIG. 10A is a diagram illustrating an example of multi-threaded processing of horizontal loop filtering 1000. FIG. 10B is a diagram illustrating an example of multi-threaded processing of vertical loop filtering 1050. After the completion of picture decompression, a thread manager (e.g., an internal decoding thread manager) may use the working threads (e.g., all of the working threads) for loop filtering. Loop filtering may be separated into two stages, for example, horizontal loop filtering and vertical loop filtering. Loop filtering may be performed at the picture level. In a loop filtering stage, a picture of a video stream may be partitioned into one or more LCU regions (e.g., as shown in FIGS. 10A and 10B). The one or more LCU regions may include one or more LCU rows. The one or more LCU regions may include one or more LCU columns. The one or more LCU regions may or may not be of equal sizes. A thread may filter a LCU region in parallel with another LCU region. A horizontal filtering thread may work on one set of LCU rows, for example, as shown in FIG. 10A. A vertical filtering thread may work on one set of LCU columns, for example, as shown in FIG. 10B.

Figure 11:
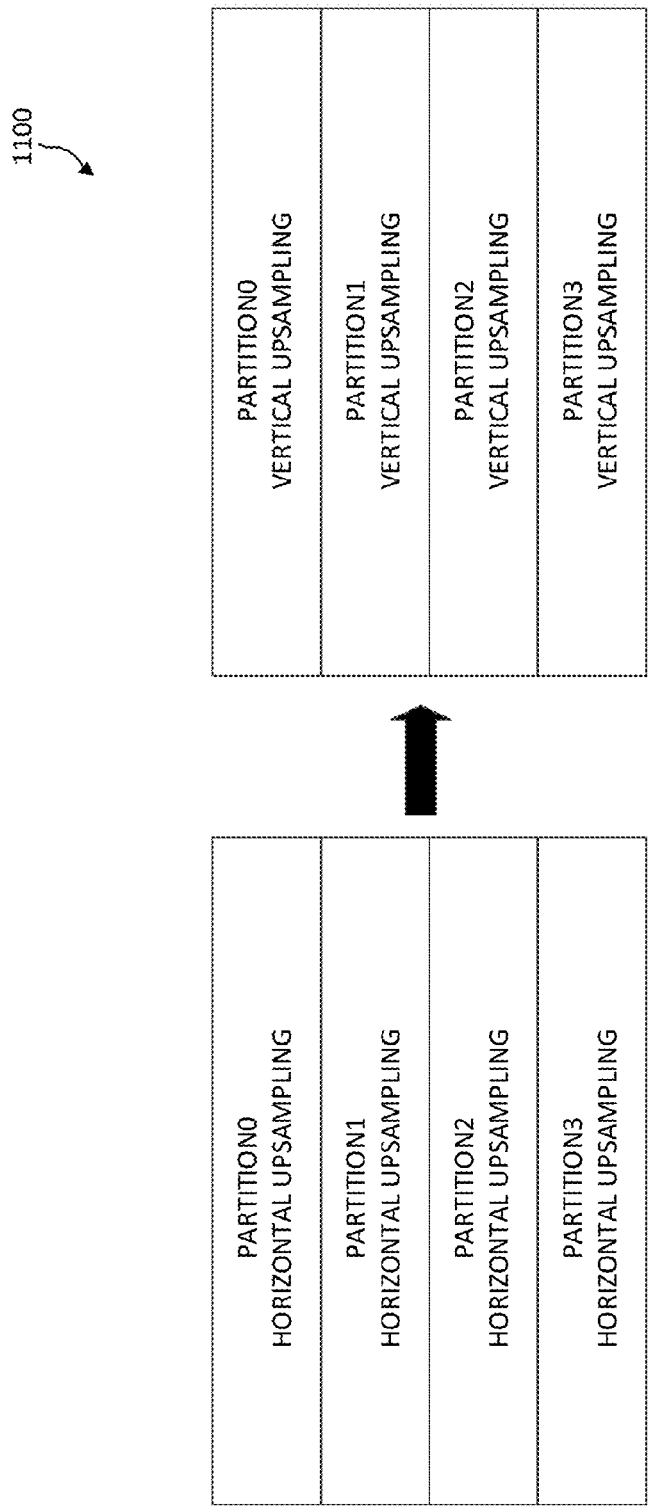
FIG. 11 is a diagram illustrating an example of multi-threaded upsampling.

FIG. 11 is a diagram illustrating an example multi-threaded upsampling framework 1100. Parallel processing of an inter-layer process may be performed. The spatial upsampling (e.g., to generate an ILR reference picture) may be divided into a horizontal up-sampling stage and a vertical up-sampling stage. The horizontal up-sampling stage and the vertical up-sampling stage may be performed sequentially. One or more working threads may be applied for an up-sampling stage. A picture may be partitioned into multiple regions, for example, as shown in FIG. 11. A thread may work on a partition for a horizontal upsampling interpolation and/or a vertical upsampling interpolation.

SIMD optimization may be provided. Modules such as, but not limited to, motion compensation, inverse transform, de-quantization, and/or reconstruction may be optimized using SSE4 SIMD instructions. The SIMD instruction may use 128-bit (e.g., 32-bit CPU) and/or 256-bit (e.g., 64-bit CPU) registers, for example, instead of 32 bit registers for operations resulting in improved decoding performance. Memory optimization may be applied (e.g., to avoid multiple memory allocation and de-allocations during a slice and/or CU level decoding).

Parallel decoding may be performed, for example, in the case where a video bitstream has not been specifically designed for parallel decoding (e.g., to a non-wavefront encoded bitstream, and/or the like). A first thread (e.g., or a first set of threads) may be used to decode a base layer picture, and a second thread (e.g., or a second set of threads) may be used to decode an enhancement layer picture. Two or more slices within a picture (e.g., if the picture was coded as multiple slices) may be decoded in parallel. For example, one thread may decode each slice.

Parallel decoding may be performed within a slice of a picture, for example, a slice that is not encoded using a Wavefront tool.

Entropy decoding (e.g., within a slice) may be performed sequentially, for example, since the entropy decoding model may have a continually evolving state. Entropy decoding of bits at position N may be performed if bits 0 through N-1 are decoded, for example, to have the correct entropy decoding state when you get to bit N. An Entropy Decoding (ED) thread may be used per slice.

An ED thread may progress through the slice, for example, performing an ED process for LCUs within a LCU group. When the ED thread reaches the end of a LCU Group, a Decompression Thread may finish the decoding and/or reconstruction process for the LCU group. For example, one or more decompression threads may be used as the ED thread performs entropy decoding through a bitstream (e.g., linearly through the bitstream). The bitstream may include a base layer video stream and/or an enhancement layer video stream. An ED thread may process the bits (e.g., all the bits) from a slice. A decompression thread may process one LCU Group at a time. The decompression thread may receive the decoded symbols produced by the ED thread, and uses the decoded symbols to perform one or more of motion compensation (MC), inverse transform (IT), dequantization (DQ), and/or reconstruction of the LCU's in an LCU Group of which the decompression thread is servicing.

A decoder (e.g., a slice decoder) may be limited in the number of threads it can spawn. For example, the slice decoder may have some max number of decompression threads (suitable for the HW, for example). When a decompression thread finishes decompressing an LCU Group, the decompression thread may be assigned another LCU Group (e.g., an LCU group which has been entropy decoded by an ED thread). The assignment of LCU group to the decompression thread may not be a round-robin assignment. An LCU Group may be assigned to a decompression thread when it is entropy decoded and waiting for decompression, for example, by the next available decompression thread.

LCU may refer to a Largest Decoding Block. LCU may refer to a standard block based image and/or one or more video encoding structures (e.g., Coding Units, Macroblocks, and/or the like). A LCU Group may refer to one or more LCUs. For example, a plurality of LCU's (e.g., or other block based coding unit) may be divided into groups, for example, for efficient parallel processing at a decoder. For example, an encoder may not be aware of LCU Groups and/or of how to partitions the LCU's into LCU groups.

Two or more threads may perform loop filtering and/or upsampling (e.g., in parallel).

A decoder may select (e.g., adaptively select) a LCU Group size (e.g., for efficient parallel decoding). A LCU Group size may be determined based on content properties (e.g., bit rate), hardware properties (e.g., a number of available threads), and/or based on the speed of entropy decoding. A decoder may assign (e.g., adaptively assign) one or more threads to a decompression task. A decoder may select the number of threads to assign to the decompression task within a slice.

One or more threads may be assigned (e.g., adaptively assigned) across layers. For example, there may not be a fixed number of threads assigned to a base layer picture and/or a fixed number of threads assigned to an enhancement layer picture. A system may assign (e.g., adaptively assign) one or more threads across the layers, for example, depending on the current task going on at each layer. The base layer picture decoding may occur faster than the enhancement layer picture decoding (e.g., because the EL may be higher resolution, may have more LCU's per picture, may have higher bit rate, and/or the like). For example, the thread(s) working on decoding a base layer picture N+1 may be done before an enhancement layer picture N has been decoded. Instead of having those base layer thread(s) sit idle (e.g., and there may be limited space to store decoded base layer pictures and/or BL decoding may not be performed ahead of EL encoding), the system may apply (e.g., adaptively apply) those BL thread(s) to decoding an EL picture (e.g., a current EL picture). The system may assign (e.g., re-assign) the BL threads back to BL picture decoding after the EL process has caught up.

Decoding a video bitstream may include segmenting the video bitstream (e.g., a portion of the video bitstream) into groups of LCUs. The video bitstream may be a single layer bitstream and/or a scalable bitstream. An entropy decoding thread may be assigned to perform entropy decoding of the LCU groups in an order. The entropy decoding thread may generate a signal upon completion of the entropy decoding of a first LCU of the LCU group. A first decompression thread may be assigned to perform decompression (e.g., one or more of MC, IT, DQ, and/or the like) for the first LCU. For example, the first decompression thread may be assigned in response to the signal generated by the entropy decoding thread. A second decompression thread may be assigned to perform decompression for a second LCU, for example, in response to a signal generated by an entropy decoding thread that entropy decodes a second LCU of the LCU group. The first decompression thread, the second decompression thread, and the entropy decoding thread(s) may be different threads. The first decompression thread and the second decompression thread may perform the decompression operations concurrently. A portion of the bitstream may be a slice, a picture, and/or the like. The size of the first LCU and/or the LCU may be determined, for example, as described herein. A number of threads may be set, for example, as described herein. For example, the total number of decompression threads may be set by a user.

A layer-specific thread manager may be provided. For example, a signal may be sent from an entropy decoding thread to the thread manager. The thread manager may assign one or more decompression threads based on the signal from the entropy decoding thread. N decompression threads may be used, which for example, may be assigned LCUs based on a round robin fashion and/or based on which decompression thread is free at the time entropy decoding of an LCU is finished.

Figure 12A:
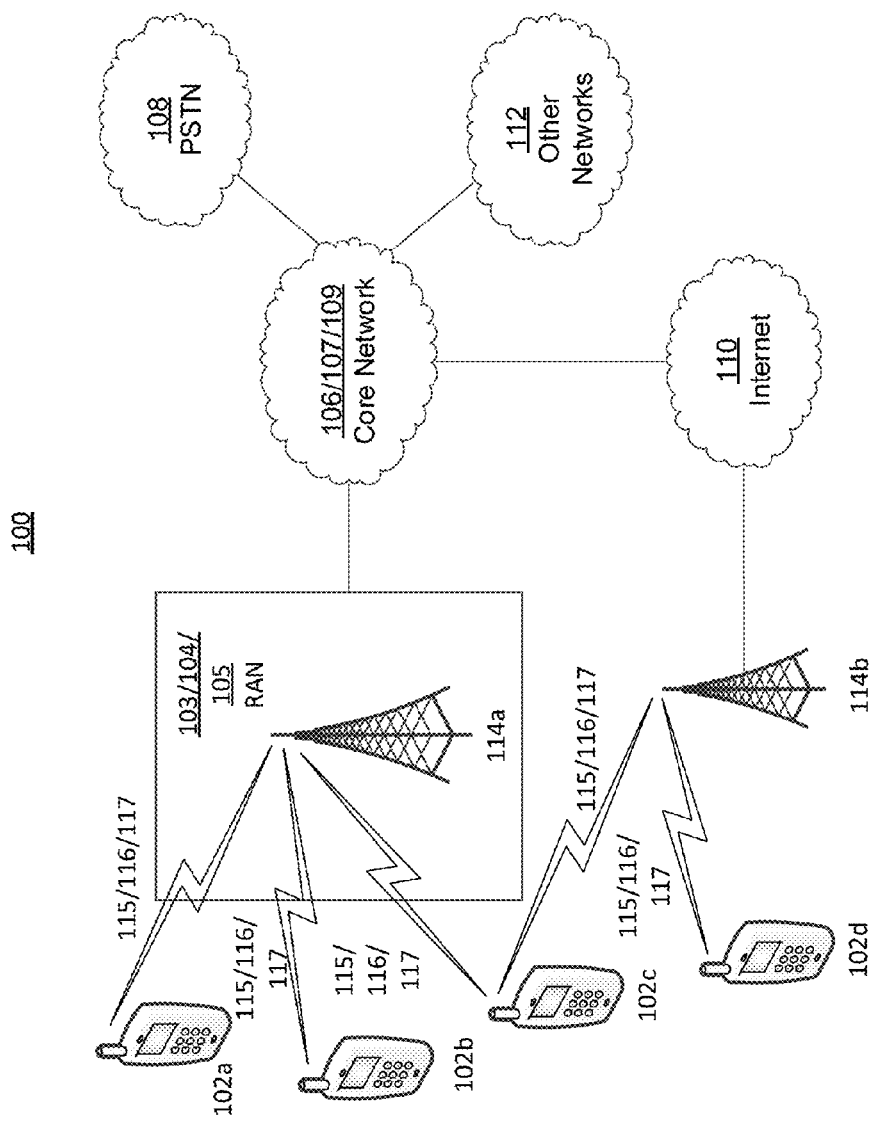
FIG. 12A is a system diagram of an example communications system in which one or more disclosed embodiments may be implemented.

FIG. 12A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 12A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 12A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 12A may be configured to communicate with the base station 114*a*, which may employ a cellular-based radio technology, and with the base station 114*b*, which may employ an IEEE 802 radio technology.

Figure 12B:
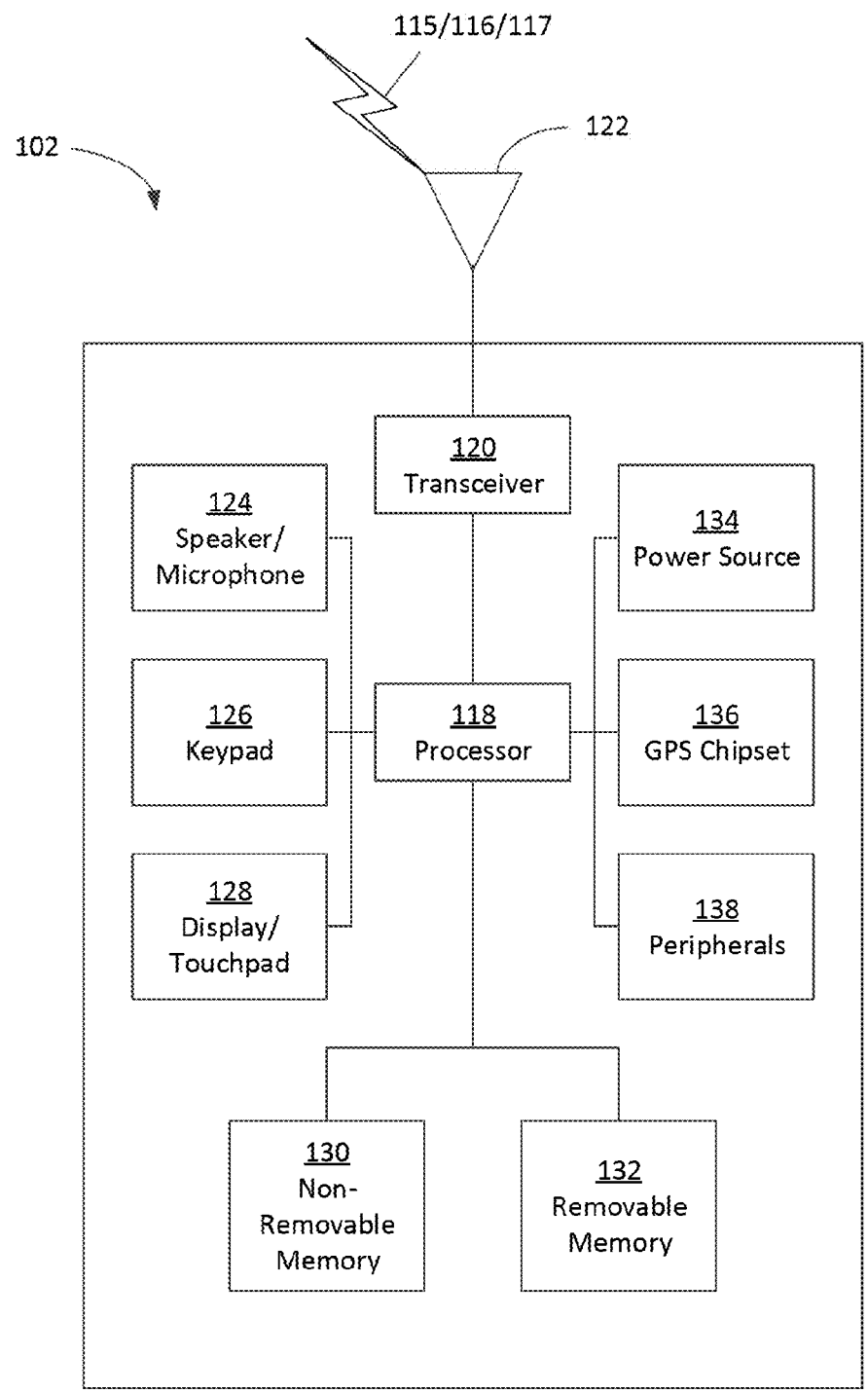
FIG. 12B is a system diagram of an example wireless transmit/receive unit (WTRU) that may be used within the communications system illustrated in FIG. 12A.

FIG. 12B is a system diagram of an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 12B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
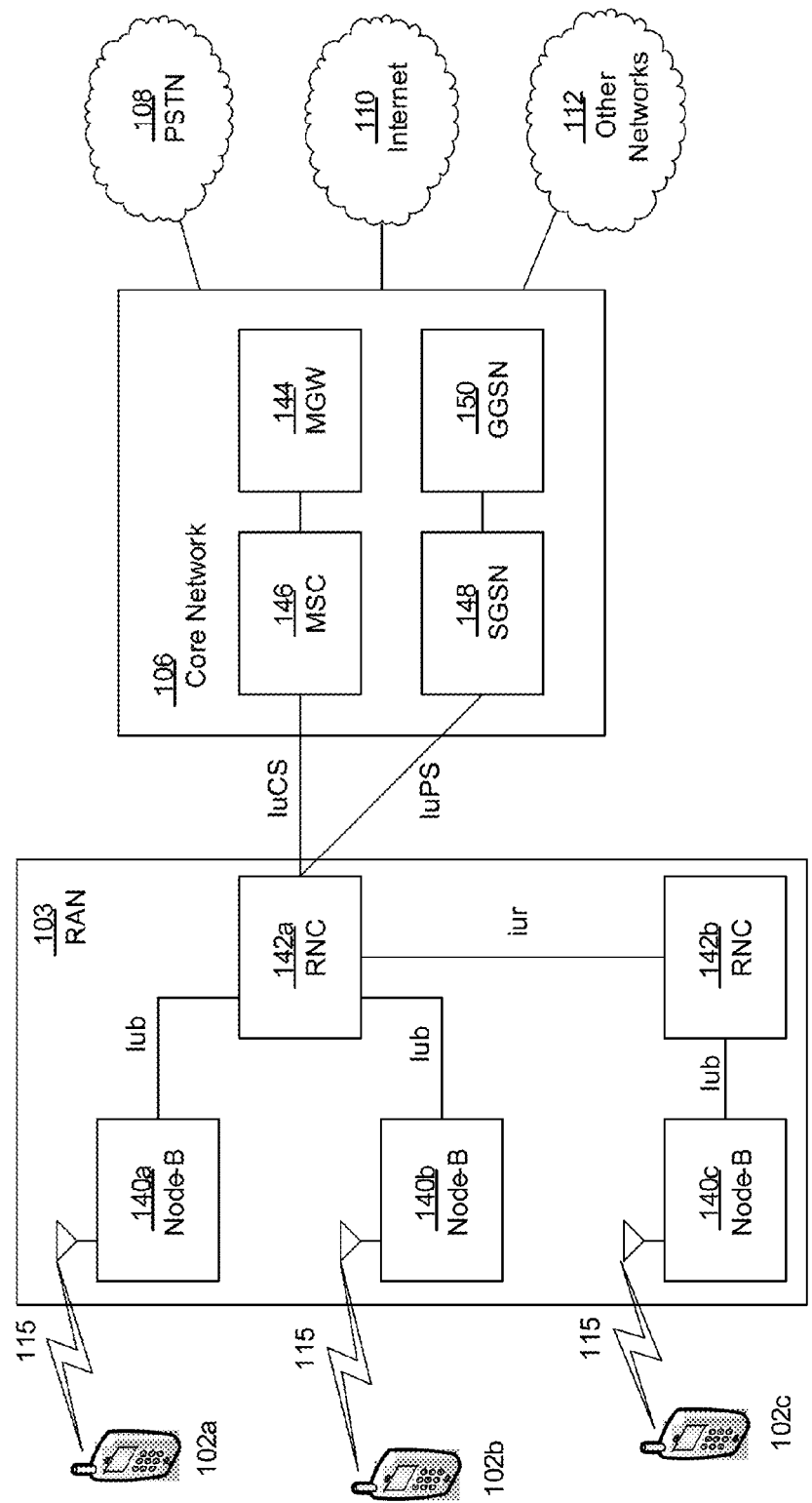
FIG. 12C is a system diagram of an example radio access network and an example core network that may be used within the communications system illustrated in FIG. 12A.

FIG. 12C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 12C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 12C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 12D:
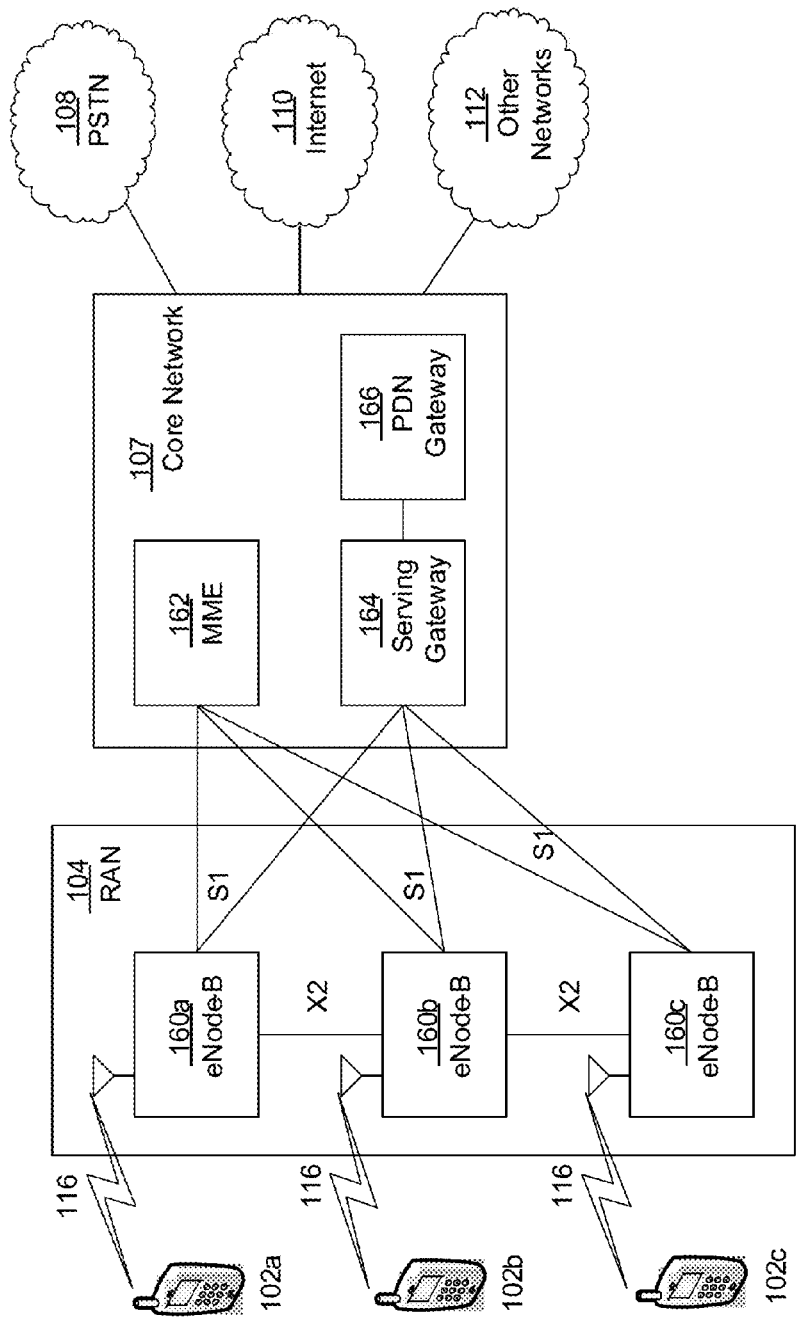
FIG. 12D is a system diagram of another example radio access network and another example core network that may be used within the communications system illustrated in FIG. 12A.

FIG. 12D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 12D, the eNode-Bs 160a, 160b, 160c may communicate with one another over an X2 interface.

The core network 107 shown in FIG. 12D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 12E:
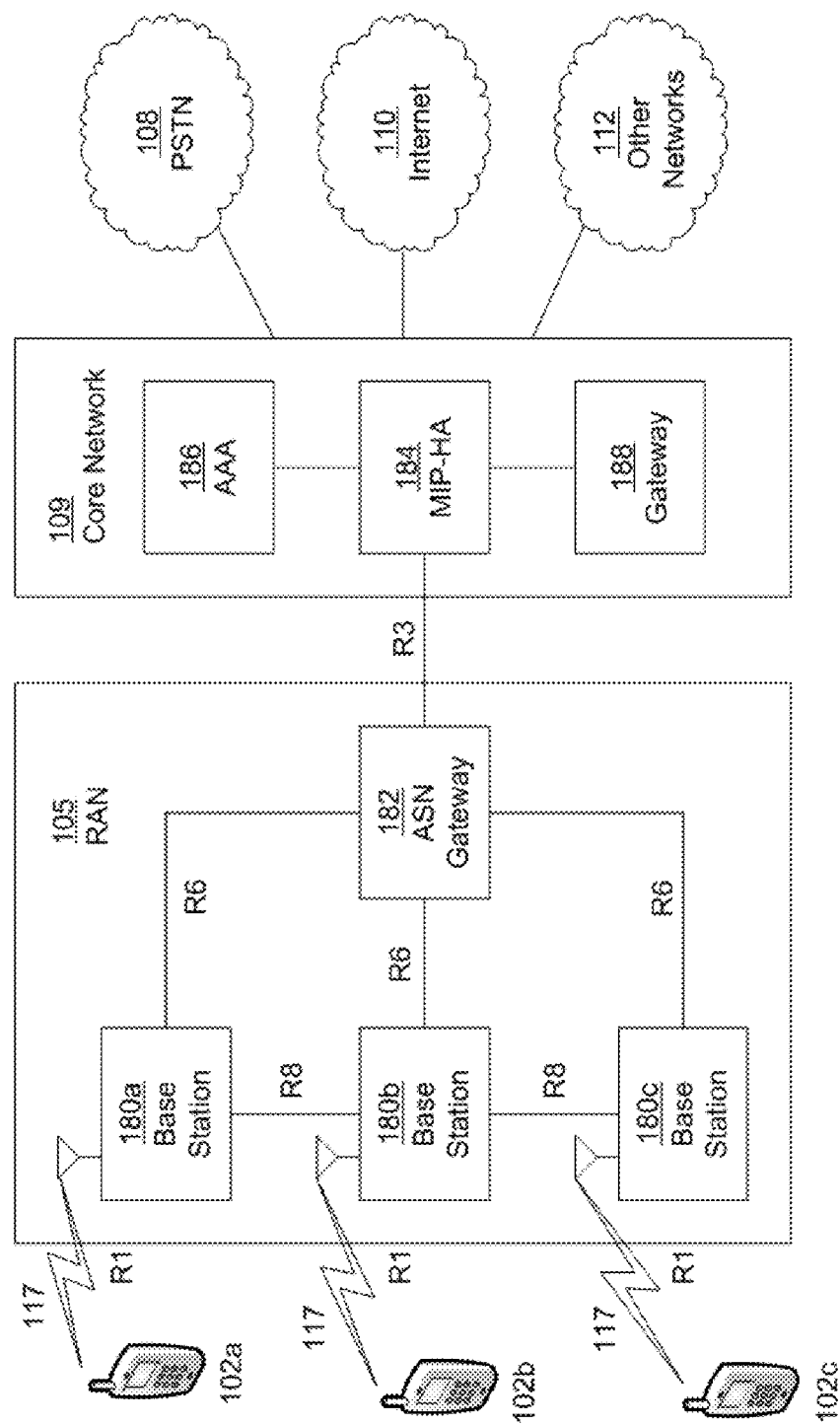
FIG. 12E is a system diagram of another example radio access network and another example core network that may be used within the communications system illustrated in FIG. 12A.

FIG. 12E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 12E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 12E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 12E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding method comprising:
receiving a base layer video stream and an enhancement layer video stream;
decoding a picture of the base layer video stream via a first set of processing threads, wherein the first set of processing threads comprises a first entropy decoding thread and one or more first additional processing threads, and wherein decoding the picture of the base layer video stream comprises:
entropy decoding, using the first entropy decoding thread, the picture of the base layer video stream to generate first entropy decoding symbols; and
performing decompression based on the first entropy decoding symbols generated via the entropy decoding of the picture of the base layer video stream, using the one or more first additional processing threads, for portions of the picture of the base layer video stream upon completion of entropy decoding for each respective portion of the portions;
generating, via the first set of processing threads, an inter-layer reference picture based on the decoded picture of the base layer video stream; and
decoding, via a second set of processing threads upon generation of the inter-layer reference picture, a picture of the enhancement layer video stream using the inter-layer reference picture, wherein the picture of the enhancement layer video stream is collocated with the picture of the base layer video stream.

2. The video decoding method of claim 1, wherein the inter-layer reference picture comprises one or more motion fields associated with the picture of the base layer video stream.

3. The video decoding method of claim 1, further comprising indicating that the inter-layer reference picture has been generated.

4. The video decoding method of claim 1, further comprising synchronizing the first set of processing threads and the second set of processing threads such that the decoding of the picture of the enhancement layer video stream is performed after the decoding of the picture of the base layer video stream.

5. The video decoding method of claim 1, wherein decoding the picture of the base layer video stream comprises entropy decoding and decompression of a slice of the picture of the base layer video stream via the first set of processing threads processed in parallel, and wherein decompressing the slice is performed based on groups of largest coding units (LCUs) of the slice such that upon completion of entropy decoding of a first group of LCUs of the slice by the first entropy decoding thread the first group of LCUs is decompressed via one of the first additional processing threads and a second group of LCUs of the slice is entropy decoded by the first entropy decoding thread.

6. The video decoding method of claim 1, wherein the decompression comprises one or more of motion compensation, inverse transformation, de-quantization, or reconstruction.

7. The video decoding method of claim 1, wherein the one or more first additional processing threads comprises a first decompression thread and a second decompression thread, and performing decompression comprises the first decompression thread performing decompression on a first group of largest coding units (LCUs) of a slice while the second decompression thread is performing decompression on a second group of LCUs of the slice.

8. The video decoding method of claim 1, wherein the second set of processing threads comprises a second entropy decoding thread and one or more second additional processing threads, and wherein decoding the picture of the enhancement layer video stream comprises:
- entropy decoding, using the second entropy decoding thread, the picture of the enhancement layer video stream to generate second entropy decoding symbols, and
- performing decompression based on the second entropy decoding symbols generated via the entropy decoding of the picture of the enhancement layer video stream, using the one or more second additional processing threads, for portions of the picture of the enhancement layer video stream upon completion of entropy decoding for each respective portion of the portions.

9. A device for decoding a video stream comprising one or more processors configured at least in part to:
- receive a base layer video stream and an enhancement layer video stream;
- decode a picture of the base layer video stream via a first set of processing threads, wherein the first set of processing threads comprises a first entropy decoding thread and one or more first additional processing threads, and wherein being configured to decode the picture of the base layer video stream comprises being configured to:
  - entropy decode, using the first entropy decoding thread, the picture of the base layer video stream to generate first entropy decoding symbols, and
  - perform decompression based on the first entropy decoding symbols generated via the entropy decoding of the picture of the base layer video stream, using the one or more first additional processing threads, for portions of the picture of the base layer video stream upon completion of entropy decoding for each respective portion of the portions;
- generate, via the first set of processing threads, an inter-layer reference picture based on the decoded picture of the base layer video stream; and
- decode, via a second set of processing threads upon generation of the inter-layer reference picture, a picture of the enhancement layer video stream using the inter-layer reference picture, wherein the picture of the enhancement layer video stream is collocated with the picture of the base layer video stream.

10. The device of claim 9, wherein the inter-layer reference picture comprises one or more motion fields associated with the picture of the base layer video stream.

11. The device of claim 9, wherein the one or more processors are further configured to indicate that the inter-layer reference picture has been generated.

12. The device of claim 9, wherein the one or more processors are further configured to synchronize the first set of processing threads and the second set of processing threads such that the decoding of the picture of the enhancement layer video stream is performed after the decoding of the picture of the base layer video stream.

13. The device of claim 9, wherein decoding the picture of the base layer video stream comprises entropy decoding and decompression of a slice of the picture of the base layer video stream via the first set of processing threads processed in parallel, and wherein decompressing the slice is performed based on groups of largest coding units (LCUs) of the slice such that upon completion of entropy decoding of a first group of LCUs of the slice by the first entropy decoding thread the first group of LCUs is decompressed via one of the first additional processing threads and a second group of LCUs of the slice is entropy decoded by the first entropy decoding thread.

14. The device of claim 9, wherein the decompression comprises one or more of motion compensation, inverse transformation, de-quantization, or reconstruction.

15. The device of claim 14, wherein the one or more first additional processing threads comprises a first decompression thread and a second decompression thread, and performing decompression comprises the first decompression thread performing decompression on a first group of largest coding units (LCUs) of a slice while the second decompression thread is performing decompression on a second group of LCUs of the slice.

16. The device of claim 15, wherein the second set of processing threads comprises a second entropy decoding thread and one or more second additional processing threads, and wherein being configured to decode the picture of the enhancement layer video stream comprises being configured to:
- entropy decode, using the second entropy decoding thread, the picture of the enhancement layer video stream to generate second entropy decoding symbols, and
- performing decompression based on the second entropy decoding symbols generated via the entropy decoding of the picture of the enhancement layer video stream, using the one or more second additional processing threads, for portions of the picture of the enhancement layer video stream upon completion of entropy decoding for each respective portion of the portions.

17. A video decoding method comprising:
- receiving a base layer video stream and an enhancement layer video stream;
- decoding the base layer video stream via a first set of processing threads, wherein the first set of processing threads comprises a first entropy decoding thread and one or more first additional processing threads, and wherein decoding the base layer video stream comprises:
  - entropy decoding, using the first entropy decoding thread, the base layer video stream to generate entropy decoding symbols, and
  - performing decompression based on the entropy decoding symbols generated via the entropy decoding of the base layer video stream, using the one or more first additional processing threads, for portions of the base layer video stream upon completion of entropy decoding for each respective portion of the portions;
- generating, via the first set of processing threads, inter-layer information based on the decoded base layer video stream; and
- decoding, via a second set of processing threads upon generation of the inter-layer information, the enhancement layer video stream using the inter-layer information.

18. The video decoding method of claim 17, further comprising synchronizing the first set of processing threads and the second set of processing threads such that the decoding of a picture of the enhancement layer video stream is performed after the decoding of a collocated base layer picture of the base layer video stream and the generation of inter-layer information from the collocated base layer picture.

19. The video decoding method of claim 17, wherein decoding the base layer video stream and generating the inter-layer information via the first set of processing threads are performed substantially simultaneously with decoding the enhancement layer video stream via the second set of processing threads.

20. The video decoding method of claim 17, wherein decoding the base layer video stream comprises entropy decoding a slice of the base layer video stream via one or more of the first set of processing threads processed in parallel.

21. The video decoding method of claim 20, wherein decoding the base layer video stream further comprises decompression of the slice via the first set of processing threads processed in parallel based on groups of largest coding units (LCUs) of the slice such that upon completion of entropy decoding of a first group of LCUs of the slice by the first entropy decoding thread the first group of LCUs is decompressed via one of the first additional processing threads and a second group of LCUs of the slice is entropy decoded by the first entropy decoding thread.

22. The video decoding method of claim 21, wherein the decompression comprises one or more of motion compensation, inverse transformation, de-quantization, or reconstruction.

23. The video decoding method of claim 17, wherein the base layer video stream and the enhancement layer video stream are decoded at a picture level or a slice level.

24. The video decoding method of claim 1, wherein the one or more first additional processing threads are progressively assigned to perform the decompression upon completion of the entropy decoding for each respective portion.

25. The video decoding method of claim 7, wherein the first group of LCUs is ready for decompression upon completion of entropy decoding for the first group of LCUs, and wherein the second group of LCUs is ready for decompression upon completion of entropy decoding for the second group of LCUs.

26. The device of claim 9, wherein the one or more first additional processing threads are progressively assigned to perform the decompression upon completion of the entropy decoding for each respective portion.

27. The device of claim 15, wherein the first group of LCUs is ready for decompression upon completion of entropy decoding for the first group of LCUs, and wherein the second group of LCUs is ready for decompression upon completion of entropy decoding for the second group of LCUs.

28. The video decoding method of claim 17, wherein the one or more first additional processing threads are progressively assigned to perform the decompression upon completion of the entropy decoding for each respective portion.

29. The video decoding method of claim 21, wherein the first group of LCUs is ready for decompression upon completion of entropy decoding for the first group of LCUs, and wherein the second group of LCUs is ready for decompression upon completion of entropy decoding for the second group of LCUs.

\* \* \* \* \*